(12) United States Patent
Cole et al.

(10) Patent No.: US 10,137,413 B2
(45) Date of Patent: Nov. 27, 2018

(54) DIESEL OXIDATION CATALYST HAVING A CAPTURE REGION FOR SULFUR CONTAINING IMPURITIES

(71) Applicant: Johnson Matthey Public Limited Company, London (GB)

(72) Inventors: Kieran Cole, Royston (GB); Lothar Hofmann, Redwitz (DE); Calum Robertson, Exeter (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 15/668,829

(22) Filed: Aug. 4, 2017

(65) Prior Publication Data
US 2018/0036680 A1 Feb. 8, 2018

(30) Foreign Application Priority Data
Aug. 5, 2016 (GB) .................................. 1613502.2

(51) Int. Cl.
*F01N 3/10* (2006.01)
*B01D 53/94* (2006.01)
(Continued)

(52) U.S. Cl.
CPC ....... *B01D 53/9459* (2013.01); *B01D 53/944* (2013.01); *B01D 53/949* (2013.01); *B01J 21/04* (2013.01); *B01J 23/42* (2013.01); *B01J 23/44* (2013.01); *B01J 35/0006* (2013.01); *B01J 35/006* (2013.01); *B01J 35/04* (2013.01); *B01J 35/1009* (2013.01); *B01J 35/1014* (2013.01); *B01J 37/0236* (2013.01); *B01J 37/0244* (2013.01); *B01J 37/038* (2013.01);
(Continued)

(58) Field of Classification Search
CPC ....... F01N 3/103; F01N 3/106; B01D 53/944; B01D 53/9459; B01J 35/04; B01J 35/0006
USPC .......................................... 422/171, 177, 180
See application file for complete search history.

(56) References Cited

U.S. PATENT DOCUMENTS 6,348,177 B1   2/2002 Bartley et al.
6,419,890 B1 *  7/2002 Li ...................... B01D 53/9422
                                                423/213.5
(Continued)

FOREIGN PATENT DOCUMENTS

GB     2535327 A    8/2016
GB     2537710 A   10/2016
(Continued)

*Primary Examiner* — Tom P Duong
(74) *Attorney, Agent, or Firm* — Gary D. Mangels

(57) ABSTRACT

An oxidation catalyst is described for treating an exhaust gas produced by a diesel engine. The oxidation catalyst comprises: a substrate; a capture material for capturing at least one sulfur containing impurity in the exhaust gas produced by the diesel engine; wherein the capture material comprises a metal for reacting with an oxide of sulfur in the exhaust gas and particles of a refractory oxide, wherein the particles of the refractory oxide have a mean specific surface area $\leq 50$ $m^2/g$; and a catalytic region disposed on the substrate; wherein the catalytic region comprises a catalytic material comprising a platinum group metal (PGM) selected from the group consisting of platinum (Pt), palladium (Pd) and a combination of platinum (Pt) and palladium (Pd).

26 Claims, 4 Drawing Sheets

(51) Int. Cl.
- *B01J 21/04* (2006.01)
- *B01J 23/42* (2006.01)
- *B01J 23/44* (2006.01)
- *B01J 35/00* (2006.01)
- *B01J 35/04* (2006.01)
- *B01J 37/02* (2006.01)
- *B01J 37/08* (2006.01)
- *B01J 37/03* (2006.01)
- *B01J 35/10* (2006.01)

(52) U.S. Cl.
CPC ............ *B01J 37/088* (2013.01); *F01N 3/103* (2013.01); *F01N 3/106* (2013.01); *B01D 2255/1021* (2013.01); *B01D 2255/1023* (2013.01); *B01D 2255/9155* (2013.01); *B01D 2255/9202* (2013.01); *F01N 2570/10* (2013.01); *F01N 2570/12* (2013.01); *F01N 2570/14* (2013.01)

(56) References Cited

U.S. PATENT DOCUMENTS

| | | | |
|---|---|---|---|
| 2008/0038172 A1* | 2/2008 | Chen | B01D 53/945 423/213.2 |
| 2009/0007553 A1 | 1/2009 | Simon, III et al. | |
| 2012/0128557 A1 | 5/2012 | Nunan et al. | |
| 2012/0251767 A1* | 10/2012 | Ishikawa | B01D 46/2429 428/116 |
| 2014/0161693 A1 | 6/2014 | Brown et al. | |

FOREIGN PATENT DOCUMENTS

| | | |
|---|---|---|
| GB | 2546158 A | 7/2017 |
| WO | 199601969 A1 | 1/1996 |
| WO | 9947260 A1 | 9/1999 |
| WO | 2007077462 A1 | 7/2007 |
| WO | 2011080525 A1 | 7/2011 |
| WO | 2015015182 A1 | 2/2015 |

* cited by examiner

DIESEL OXIDATION CATALYST HAVING A CAPTURE REGION FOR SULFUR CONTAINING IMPURITIES

CROSS REFERENCE TO RELATED APPLICATIONS

This application claims priority benefit to Great Britain Patent Application No. 1613502.2 filed on Aug. 5, 2016, which is incorporated herein by reference.

FIELD OF THE INVENTION

The invention relates to an oxidation catalyst and an exhaust system for treating an exhaust gas produced by a diesel engine. The invention further relates to a method or the use of the oxidation catalyst for capturing at least one sulfur containing impurity in the exhaust gas produced by the diesel engine. The invention also relates to a vehicle comprising the oxidation catalyst or the exhaust system.

BACKGROUND TO THE INVENTION

Diesel engines produce an exhaust gas that contains a variety of pollutants that are the subject of environmental legislation around the world. These pollutants include carbon monoxide (CO), unburned hydrocarbons (HCs), oxides of nitrogen ($NO_x$) and particulate matter (PM). To meet permissible levels of pollutants that may be emitted into the atmosphere set by legislation, exhaust systems for treating the exhaust gas produced by a diesel engine generally contain several emissions control devices. In such exhaust systems, the exhaust gas is usually passed to a first emissions control device that is able to oxidise carbon monoxide (CO) and the unburned hydrocarbons (HCs) that are present in the gas.

In addition to the pollutants mentioned above, the exhaust gas may contain impurities that originate from the specific type of fuel that has been used. Diesel fuel often comprises sulfur-containing impurities. Under the lean conditions used for combustion in a diesel engine, the sulfur-containing impurities typically form oxides of sulfur. These oxides of sulfur can poison some of the catalytically active metals in the emissions control devices of an exhaust system. In addition, the oxides of sulfur can form particulate matter or can contribute to the formation of acid rain when passed into the atmosphere.

Many countries have implemented legislation to restrict the maximum amount of sulfur that is allowed in diesel fuel. Aside from the environmental benefits, such legislation also facilitated the use of new emissions control technologies that could not tolerate the previous high levels of sulfur in diesel exhaust gas. Despite the reduction in sulfur content, the activity of some emissions control devices can still deteriorate through poisoning by oxides of sulfur.

SUMMARY OF THE INVENTION

The invention provides an oxidation catalyst for treating an exhaust gas produced by a diesel engine. The oxidation catalyst comprises: a substrate; a capture material for capturing at least one sulfur containing impurity in the exhaust gas produced by the diesel engine; wherein the capture material comprises a metal for reacting with an oxide of sulfur in the exhaust gas and particles of a refractory oxide, preferably wherein the particles of the refractory oxide have a mean specific surface area ≤50 $m^2/g$; and a catalytic region disposed on the substrate; wherein the catalytic region comprises a catalytic material comprising a platinum group metal (PGM) selected from the group consisting of platinum (Pt), palladium (Pd) and a combination of platinum (Pt) and palladium (Pd).

The inventors have developed a cost-effective capture material for trapping or capturing at least one sulfur containing impurity in the exhaust gas produced by the diesel engine. The capture material reduces or prevents degradation of the oxidative activity of the oxidation catalyst, such as toward carbon monoxide (CO), unburned hydrocarbons (HCs) and/or nitric oxide (NO). The capture material may also prevent any sulfur containing impurities from degrading the performance of an emissions control device that is downstream of the DOC, such as a selective catalytic reduction (SCR) catalyst or a selective catalytic reduction filter (SCRF™) catalyst, by trapping the impurity within the DOC.

The invention also relates to an exhaust system for treating an exhaust gas produced by a diesel engine. The exhaust system comprises the oxidation catalyst of the invention and optionally a (i.e. a further) emissions control device.

The invention further provides a vehicle. The vehicle comprises a diesel engine and either an oxidation catalyst or an exhaust system of the invention.

The invention also relates to the use of a capture material or a capture region comprising the capture material (e.g. in or as part of an oxidation catalyst) for capturing or trapping at least one sulfur containing impurity in an exhaust gas produced by a diesel engine. The capture material comprises a metal for reacting with an oxide of sulfur in the exhaust gas and particles of a refractory oxide, preferably wherein the particles of the refractory oxide have a mean specific surface area ≤50 $m^2/g$. The oxidation catalyst comprises the capture material or the capture region; a substrate; and a catalytic region disposed on the substrate, wherein the catalytic region comprises a catalytic material comprising a platinum group metal (PGM) selected from the group consisting of platinum (Pt), palladium (Pd) and a combination of platinum (Pt) and palladium (Pd).

The invention further relates to a method of capturing or trapping at least one sulfur containing impurity in an exhaust gas produced by a diesel engine. The method comprises the step of passing an exhaust gas produced by a diesel engine through an exhaust system comprising the oxidation catalyst of the invention.

BRIEF DESCRIPTION OF THE DRAWINGS

FIG. 1 shows an oxidation catalyst having a capture layer (2) disposed on a catalytic layer (3). The catalytic layer (3) is disposed on a substrate (1).

FIG. 2 shows an oxidation catalyst having a capture layer (2) disposed on a catalytic region. The catalytic region has a first catalytic zone (3) and a second catalytic zone (4), which are disposed on a substrate (1).

FIG. 3 shows an oxidation catalyst having a capture zone (2) disposed on a substrate (1) at the inlet end of the oxidation catalyst. There is catalytic zone (3) at the outlet end of the oxidation catalyst.

FIG. 4 shows an oxidation catalyst having a capture zone (2) disposed at an inlet end of the substrate (1). There is first catalytic zone (3) disposed on a second catalytic zone (4), which are disposed at an outlet end of the substrate.

FIG. 5 shows an oxidation catalyst having a catalytic layer (3) disposed on a substrate (1). There is capture zone (2) at the inlet end of the substrate, which is disposed on the catalytic layer (3).

FIG. 6 shows an oxidation catalyst having a capture zone (2) disposed on a substrate at an inlet end. The capture region (2) overlaps a catalytic zone (3). The catalytic zone (3) is disposed at an outlet end of the substrate.

FIG. 7 shows an oxidation catalyst having a capture zone (2) and a first catalytic zone (3), which are disposed on a second catalytic layer (4). The second catalytic layer (4) is disposed on a substrate (1).

FIG. 8 shows an oxidation catalyst having a capture zone (2) disposed on a first catalytic layer (3). The first catalytic layer (3) is disposed on a second catalytic layer (4). The second catalytic layer (4) is disposed on a substrate (1).

FIG. 10 shows an oxidation catalyst having a catalytic region (3) disposed on a substrate (1). There is a capture face (2) disposed or supported at an inlet end surface of the substrate (1).

FIG. 11 shows an oxidation catalyst having a catalytic region (3) disposed on a substrate (1). There is a capture face and zone (2) disposed or supported at an inlet end surface of the substrate, which partially overlies the catalytic region (3).

DETAILED DESCRIPTION OF THE INVENTION

Figure 1:
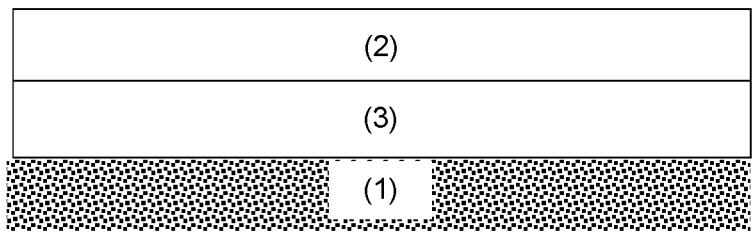
FIGS. 1 to 8, 10 and 11 are schematic drawings of oxidation catalysts of the invention.

The present invention will now be further described. The following sections relate to features of the invention, particularly features of the oxidation catalyst of the invention, and define each feature in more detail. Each part or aspect of the oxidation catalyst (e.g. the capture material, the catalytic region, the oxidation catalyst arrangement, the substrate etc.) may be combined with any other part or aspect of the oxidation catalyst unless clearly indicated to the contrary. In particular, any feature indicated as being preferred or advantageous may be combined with any other feature or features indicated as being preferred or advantageous.

The invention relates to a capture material for capturing or trapping at least one sulfur containing impurity in the exhaust gas produced by the diesel engine. The capture material may be included as part of a capture region, which can be arranged in a variety of ways to trap or capture at least one sulfur containing impurity.

The expression "capture material for capturing at least one sulfur containing impurity in an exhaust gas produced by a diesel engine" is referred to herein below by the abbreviated term "capture material".

The capture material comprises, or consists essentially of, a metal for reacting with an oxide of sulfur in the exhaust gas and particles of a refractory oxide. The expression "metal for reacting with an oxide of sulfur in the exhaust gas" is referred to herein below by the abbreviated term "S-trapping metal".

The S-trapping metal is typically disposed or supported on the refractory oxide. The S-trapping metal may be disposed directly onto or is directly supported by the refractory oxide (e.g. there is no intervening support material between the S-trapping metal and the refractory oxide). The S-trapping metal is supported on the refractory oxide by being dispersed over a surface of the refractory oxide, more preferably by being dispersed over and/or fixed onto a surface of the refractory oxide.

At least one particle of the S-trapping metal may be disposed or supported on at least one particle of the refractory oxide. Preferably, a plurality of particles of the S-trapping metal are disposed or supported on at least one particle of the refractory oxide. More preferably, there is a plurality of particles of the refractory oxide, wherein a plurality of particles of the S-trapping metal are disposed or supported on each particle of the refractory oxide.

The S-trapping metal may reversibly react with an oxide of sulfur in the exhaust gas. At normal operating temperatures, oxides of sulfur react with the S-trapping metal to reduce or prevent poisoning of the catalytic region or a catalytically active component of a downstream emissions control device. The S-trapping metal has a finite capacity for trapping or capturing oxides of sulfur. To regenerate the capture material, it is possible to thermally release trapped or captured oxides of sulfur from the S-trapping metal. The S-trapping metal may be thermally regenerated during "filter regeneration" (i.e. when a filtering substrate is heated periodically to remove accumulated particulate matter).

The S-trapping metal may be selected from palladium (Pd), magnesium (Mg), cerium (Ce) and a combination of any two or more thereof. Preferably, the S-trapping metal is palladium (Pd).

It is preferred that the particles of the S-trapping metal have a mean particle size ≥about 10 nm, such as a mean particle size >about 10 nm. More preferably, the particles of the S-trapping metal have a mean particle size ≥about 15 nm, such as ≥about 20 nm, still more preferably ≥about 50 nm, such as ≥about 75 nm.

Some of the S-trapping metals may be included in an oxidation catalyst to provide or enhance catalytic activity. The mean particle size of such metals (e.g. palladium) in conventional emissions control devices is generally much smaller than 10 nm. The particles of the S-trapping metal for use in the capture material in accordance with the invention may be relatively large. It has surprisingly been found that such large particles of the S-trapping metal are able to trap or capture an oxide of sulfur from the exhaust gas whilst being relatively catalytically inert.

Typically the S-trapping metal has a mean particle size of from 10 nm to 1000 micron. It is preferred that the S-trapping metal has a mean particle size of from 15 nm to 100 micron, more preferably 20 nm to 20 micron, particularly 50 nm to 5 micron, such as 75 nm to 3 micron.

The "mean particle size" as used herein with reference to the S-trapping metal, particularly when the S-trapping metal is palladium, can be determined by CO chemisorption, as follows. The S-trapping metal content can be measured by Inductively Coupled Plasma Optical Emission Spectroscopy (ICP-OES). The CO uptake of the sample can be measured using a Micromeritics Autochem 2920 instrument. The sample is pre-treated with hydrogen gas at 300° C. Carbon monoxide uptake is measured by pulse chemisorption at 50° C. The S-trapping metal particle size can then be calculated using Autochem 2920 software based on the CO uptake and S-trapping metal content for the sample. A chemisorption ratio for CO:Pd of 1:1 is used in the calculation.

The refractory oxide may be selected from the group consisting of alumina, silica, titania, zirconia, ceria and a mixed or composite oxide thereof, such as a mixed or composite oxide of two or more thereof. For example, the refractory oxide may be selected from the group consisting of alumina, silica, titania, zirconia, ceria, silica-alumina, titania-alumina, zirconia-alumina, ceria-alumina, titania-silica, zirconia-silica, zirconia-titania, ceria-zirconia and alumina-magnesium oxide.

The refractory oxide may optionally be doped (e.g. with a dopant). The dopant may be selected from the group consisting of zirconium (Zr), titanium (Ti), silicon (Si), yttrium (Y), lanthanum (La), praseodymium (Pr), samarium (Sm), neodymium (Nd) and an oxide thereof. The inclusion of a dopant can thermally stabilise the refractory oxide. It is to be understood that any reference to "doped" in this context refers to a material where the bulk or host lattice of the refractory oxide is substitution doped or interstitially doped with a dopant. In some instances, small amounts of the dopant may be present at a surface of the refractory oxide. However, most of the dopant will generally be present in the body of the refractory oxide.

When the refractory oxide is doped, the total amount of dopant is 0.25 to 5% by weight, preferably 0.5 to 3% by weight (e.g. about 1% by weight) of the refractory oxide.

In general, it is preferred that the refractory oxide is not doped.

It is preferred that the refractory oxide is selected from the group consisting of alumina, silica, ceria, silica-alumina, ceria-alumina, ceria-zirconia and alumina-magnesium oxide. More preferably, the refractory oxide is selected from the group consisting of alumina, ceria, silica-alumina and ceria-zirconia. More preferably, the refractory oxide is alumina, particularly α-alumina.

The particles of the refractory oxide typically have a mean specific surface area ≤about 50 $m^2/g$ (<about 50 $m^2/g$), such as ≤about 40 $m^2/g$ (<about 40 $m^2/g$), preferably ≤about 30 $m^2/g$ (<about 30 $m^2/g$), more preferably ≤about 20 $m^2/g$ (<about 20 $m^2/g$), even more preferably ≤about 10 $m^2/g$ (<about 10 $m^2/g$).

The mean specific surface area (SSA) of the particles of the refractory oxide can be determined by nitrogen physisorption at −196° C. using the volumetric method. The mean SSA is determined using the BET adsorption isotherm equation.

The particles of the refractory oxide may have a d90 of <100 micron. The particles of the refractory oxide may preferably have a d90 of <75 micron, such as <50 micron (e.g. <30 micron), and more preferably <20 micron, such as <15 micron. When the refractory oxide has a smaller d90 better packing and adhesion can be obtained.

As is known in the art, the d90 is a value of the particle size at which 90% of the particles in a distribution have a particle size below this value. For the avoidance of doubt, d90 measurements can be obtained by Laser Diffraction Particle Size Analysis using a Malvern Mastersizer 2000, which is a volume-based technique (i.e. D90 may also be referred to as $D_v90$ (or D(v,0.90)) and applies a mathematical Mie theory model to determine a particle size distribution.

Typically, the particles of the refractory oxide have a d90 of >0.1 micron. It is preferred that the particles of the refractory oxide has a d90 of >1.0 micron, such as >5.0 micron.

The particles of the refractory oxide for use in accordance with the invention have a relatively low mean specific surface area compared to the mean specific surface area of particles of the same refractory oxide that are used as a support material (e.g. for a catalytically active metal, such as a platinum group metal) in prior art emissions control devices (e.g. DOC, CSF or NSC). Generally, small refractory oxide particles having a large mean specific surface area are used in emissions control devices to maximise catalytic activity. In contrast, the particles of the refractory oxide for use in accordance with the invention are relatively large (i.e. generally much larger than when used as a support material in prior art emissions control devices).

Refractory oxides having a mean specific surface area ≤about 50 $m^2/g$ are known in the art and may be commercially available. It may also be possible to prepare such a refractory oxide by heating a refractory oxide having a mean specific surface area >50 $m^2/g$ to a high temperature, usually a temperature (e.g. 1200° C. or more) that is significantly higher than the temperature that the refractory oxide would encounter in an exhaust system of a vehicle during normal use. Thus, the refractory oxide (i.e. having a low surface area) is not formed in situ during normal use of the oxidation catalyst.

The oxidation catalyst may comprise a capture region for capturing at least one sulfur containing impurity in the exhaust gas produced by the diesel engine. The expression "capture region for capturing at least one sulfur containing impurity in the exhaust gas produced by a diesel engine" is referred to herein below by the abbreviated term "capture region".

The capture region may comprise, or consist essentially of, the capture material.

Typically, the capture region for capturing at least one sulfur containing impurity in the exhaust gas produced by the diesel engine has a loading of the refractory oxide of 0.1 to 3.5 g $in^{-3}$, preferably 0.2 to 2.5 g $in^{-3}$, still more preferably 0.3 to 2.0 g $in^{-3}$, and even more preferably 0.5 to 1.75 g $in^{-3}$ (e.g. 0.75 to 1.5 g $in^{-3}$).

Generally, the capture region has a total loading of the S-trapping metal (e.g. the metal content of the S-trapping metal) of 1 g $ft^{-3}$ to 50 g $ft^{-3}$, preferably 4 g $ft^{-3}$ to 40 g $ft^{-3}$, even more preferably 5 g $ft^{-3}$ to 30 g $ft^{-3}$.

The capture region may further comprise platinum. Platinum does not readily undergo poisoning by oxides of sulfur and it may be included in some oxidation catalyst arrangements to provide additional functionality, such as to generate $NO_2$ by oxidation of NO.

When the capture region comprises platinum, it is preferred that the capture region is disposed or supported at or near an outlet end of the substrate.

Typically the capture region comprises particles of platinum (Pt) having a mean particle size <10 nm, preferably ≤8 nm.

The particles of platinum may be disposed or supported on the refractory oxide (e.g. of the capture material). Particles of platinum may be disposed or supported on the refractory oxide by being dispersed over a surface of the refractory oxide, more preferably by being dispersed over or fixed onto a surface of the refractory oxide. When the particles of platinum are disposed on the refractory oxide, the platinum is part of the capture material, although it does not significantly contribute to the capturing or trapping of an oxide of sulfur.

Additionally or alternatively, the capture region may comprise platinum, preferably particles of platinum, such as described above. The platinum may be disposed or supported on a separate support material to the refractory oxide of the capture material. The support material for platinum in this context is referred to herein as the "Pt support material". This is to distinguish it from other support materials that may be present in the oxidation catalyst.

The Pt support material is a refractory oxide typically having a mean specific surface area 75 $m^2/g$, such as ≥100 $m^2/g$, and preferably ≥100 $m^2/g$.

The refractory oxide of the Pt support material selected from the group consisting of alumina, silica, titania, zirconia, ceria and a mixed or composite oxide thereof, such as a mixed or composite oxide of two or more thereof. For example, the refractory oxide may be selected from the group consisting of alumina, silica, titania, zirconia, ceria, silica-alumina, titania-alumina, zirconia-alumina, ceria-alumina, titania-silica, zirconia-silica, zirconia-titania, ceria-zirconia and alumina-magnesium oxide. It is preferred that the refractory oxide of the Pt support material comprises, or consists essentially of, alumina or silica-alumina.

Typically, the capture region comprises at least 50% by weight of the capture material, preferably at least 75% by weight of the capture material, preferably at least 90% by weight of the capture material.

The invention includes oxidation catalysts where the capture material and the catalytic region are arranged in a variety of ways. The optimum arrangement of the capture material on the substrate may be determined by the chemical composition and location of the catalytic material of the oxidation catalyst, and the chemical composition and location of any downstream emissions control devices. For example, if it is desirable to protect the catalytic material of the oxidation catalyst from oxides of sulfur, then this may be achieved by arranging the capture material to contact the exhaust gas before the exhaust gas is brought into contact with the catalytic material. If it is desirable to protect an emissions control device (e.g. a Cu-containing SCR or SCRF™ catalyst) disposed directly downstream of the oxidation catalyst, then this may be achieved by arranging the capture material to contact the exhaust gas before the exhaust exits the oxidation catalyst.

In the first to third oxidation catalyst arrangements below, the catalytic region preferably does not comprise the capture material.

Generally, in the first to third oxidation catalyst arrangements, the oxidation catalyst comprises a substrate, a capture region comprising the capture material and the catalytic region disposed on the substrate.

For the avoidance of doubt, the capture region and the catalytic region have different compositions.

The catalytic region is typically disposed or supported on the substrate. The catalytic region may be directly disposed or supported on the substrate (i.e. the catalytic region is in contact with a surface of the substrate).

The capture region may be:
(a) disposed or supported on the catalytic region; and/or
(b) directly disposed or supported on the substrate [i.e. the capture region is in contact with a surface of the substrate]; and/or
(c) in contact with the catalytic region [i.e. the capture region is adjacent to, or abuts, the catalytic region].

In general, the catalytic region is disposed or supported on a plurality of channel walls within the substrate (i.e. each channel wall within the substrate). The capture region is typically also disposed or supported on a plurality of channel walls of the substrate (i.e. each channel wall within the substrate).

In a first oxidation catalyst arrangement, the capture region is a capture layer. The catalytic region may be a catalytic layer or first catalytic zone and a second catalytic zone.

Figure 2:
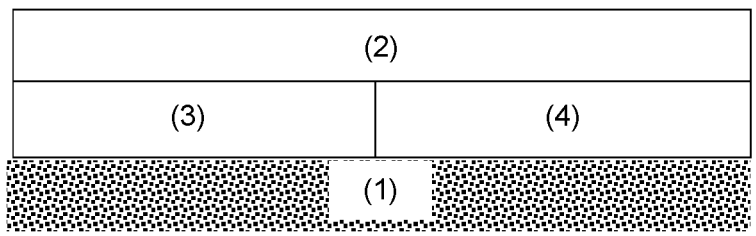

The capture layer typically extends for substantially an entire length of the substrate, particularly the entire length of the channels of a monolith substrate. See, for example, FIGS. 1 and 2.

The capture layer may consist essentially of the capture material. It is preferred that the capture layer preferably consists essentially of the capture material (i.e. a single capture material).

The catalytic region may be a catalytic layer, preferably a single catalytic layer.

When the catalytic region is a catalytic layer (see FIG. 1), then the capture layer may be disposed on the catalytic layer, and the catalytic layer may be disposed or supported (e.g. directly disposed or supported) on the substrate. Alternatively, the catalytic layer may be disposed on the capture layer, and the capture layer may be disposed or supported (e.g. directly disposed or supported) on the substrate.

When the catalytic region is a catalytic layer, then the catalytic layer preferably extends for substantially an entire length of the substrate, particularly the entire length of the channels of a monolith substrate.

It is preferred that the capture layer is disposed or supported (e.g. directly disposed or supported) on the catalytic layer, and the catalytic layer is disposed or supported (e.g. directly disposed or supported) on the substrate. In this arrangement, the exhaust gas is brought into contact with the capture layer before it is brought into contact with the catalytic layer. Such an arrangement may be advantageous for protecting the catalytic material of the oxidation catalyst and also of any downstream emissions control device that has a sulfur-sensitive catalytic material.

The catalytic region may be a first catalytic layer and a second catalytic layer, such as a second catalytic layer as herein defined below. The catalytic layer described above is referred to below as the "first catalytic layer".

It is preferred that the capture layer is disposed or supported (e.g. directly disposed or supported) on the first catalytic layer. More preferably, the first catalytic layer is disposed or supported (e.g. directly disposed or supported) on the second catalytic layer, and the second catalytic layer is disposed or supported (e.g. directly disposed or supported) on the substrate.

When the oxidation catalyst comprises a second catalytic layer, then it is preferred that the first catalytic layer comprises a support material, which is sulfur tolerant, such as described below.

Figure 3:
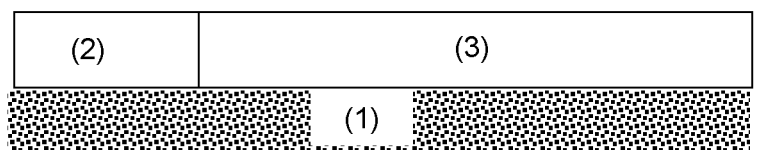

In the first oxidation catalyst arrangement, the catalytic region may be a first catalytic zone and a second catalytic zone (see FIG. 3). The capture layer is preferably disposed or supported on both the first catalytic zone and the second catalytic zone, more preferably the capture layer is directly disposed or supported on both the first catalytic zone and the second catalytic zone.

The first catalytic zone and the second catalytic zone are preferably disposed or supported on the substrate, more preferably directly disposed or supported on the substrate.

The first catalytic zone typically has a length of 2.5 to 90% (e.g. 2.5 to 50% or 50 to 90%) of the length of the substrate, preferably 5 to 80% (e.g. 5 to 45% or 45 to 80%), particularly 10 to 75% (e.g. 10 to 40% or 40 to 75%) of the length of the substrate, more preferably 15 to 65% (e.g. 15 to 30% or 30 to 65%) of the length of the substrate.

It may be preferable that the first catalyst zone has a length of 2.5 to 10% of the length of the substrate, such as 2.5 to 7.5% or 5 to 10% of the length of the substrate. It is further preferred that the first catalyst zone has a total loading of platinum group metal that is greater than the total loading of platinum group metal of the second catalyst zone.

Typically, the second catalytic zone has a length of 10 to 90% of the length of the substrate (e.g. 50 to 90%), preferably 15 to 80% of the length of the substrate (e.g. 55 to 80%), more preferably 20 to 75% (e.g. 30 to 65%) of the length of the substrate, still more preferably 30 to 65%.

It is generally preferred that the first catalytic zone is disposed or supported upstream of the second catalytic zone. More preferably, the first catalytic zone is disposed or supported at or near an inlet end of the substrate.

The first catalytic zone may adjoin the second catalytic zone. Preferably, the first catalytic zone is in contact with the second catalytic zone. When the first catalytic zone adjoins the second catalytic zone or the first catalytic zone is in contact with the second catalytic zone, then the first catalytic zone and the second catalytic zone may be disposed or supported on the substrate as a layer (e.g. a single layer). Thus, a layer (e.g. a single) may be formed on the substrate when the first and second catalytic zones adjoin or are in contact with one another.

The first catalytic zone may be separate from the second catalytic zone. There may be a gap (e.g. a space) between the first catalytic zone and the second catalytic zone.

Alternatively, the first catalytic zone may overlap the second catalytic zone. An end portion or part of the first catalytic zone may be disposed or supported on the second catalytic zone. The first catalytic zone generally only partly overlaps the second catalytic zone.

In general, it may be preferable that the first catalytic zone comprises a support material, which is sulfur tolerant, such as described below.

In a second oxidation catalyst arrangement, the capture region is a capture zone.

In general, the capture zone has a length of ≥25 mm.

Additionally or alternatively, the capture zone typically has a length of 2.5 to 90% (e.g. 2.5 to 50% or 50 to 90%) of the length of the substrate, preferably 5 to 80% (e.g. 5 to 45% or 45 to 80%), particularly 10 to 75% (e.g. 10 to 40% or 40 to 75%) of the length of the substrate, more preferably 15 to 65% (e.g. 15 to 30% or 30 to 65%) of the length of the substrate.

The capture zone may consist essentially of the capture material. It is preferred that the capture zone preferably consists essentially of the capture material (i.e. a single capture material).

The capture zone may be disposed or supported at or near an inlet end of the substrate (see, for example, FIGS. 3 to 6). More preferably, the capture zone is directly disposed or supported at or near an inlet end of the substrate. Such arrangements may be advantageous for protecting the catalytic material of the oxidation catalyst from being poisoned by an oxide of sulfur.

Alternatively, the capture zone may be disposed or supported at or near an outlet end of the substrate. More preferably, the capture zone is directly disposed or supported at or near an outlet end of the substrate. Such arrangements may be advantageous for protecting a downstream emissions control device being poisoned by an oxide of sulfur.

Figure 7:
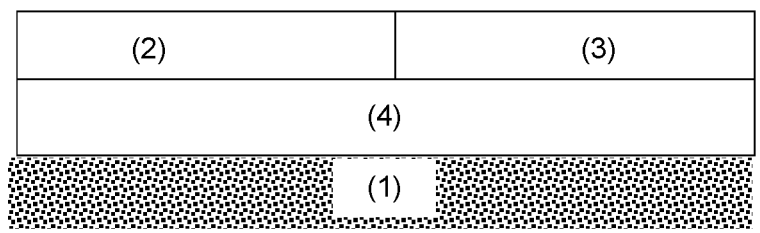
Figure 8:
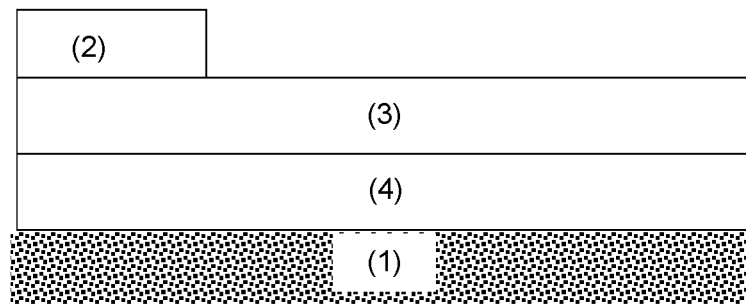

When the capture zone is disposed or support at or near either an inlet end or an outlet end of the substrate, then the catalytic region may be:

(i) a catalytic layer (see FIG. 5); or
(ii) a catalytic zone (see FIGS. 3 and 6); or
(iii) a first catalytic zone and a second catalytic zone (see FIG. 4); or
(iv) a first catalytic zone and a second catalytic layer (see FIG. 7); or
(v) a first catalytic layer and a second catalytic layer (see FIG. 8).

In (i), the catalytic region is a catalytic layer, preferably a single catalytic layer. The capture zone is typically disposed or supported (e.g. directly disposed or supported) on the catalytic layer (see FIG. 5).

The capture zone is preferably disposed or supported on the catalytic layer, such as at or near an inlet end of the substrate (see FIG. 5) or at or near an outlet end of the substrate. More preferably, the capture zone is directly disposed or supported on the catalytic layer. When the capture zone is directly disposed or supported on the catalytic layer at or near an inlet end of the substrate, the exhaust gas is brought into contact with the capture zone before it is brought into contact with most of the catalytic layer.

When the catalytic region is a catalytic layer, then the catalytic layer preferably extends for substantially an entire length of the substrate, particularly the entire length of the channels of a monolith substrate.

The catalytic layer is preferably is disposed or supported (e.g. directly disposed or supported) on the substrate.

When the capture zone is disposed or supported on the catalytic layer, it is preferred that the entire length of the capture zone is disposed or supported on the catalytic layer. The length of the capture zone is less than the length of the catalytic layer.

In (ii), the catalytic region is a catalytic zone, preferably a single catalytic zone.

The catalytic zone is preferably disposed or supported (e.g. directly disposed or supported) on the substrate.

The catalytic zone may be disposed or supported (e.g. directly disposed or supported) at or near an outlet end of the substrate. It is preferred that the capture zone is disposed or supported (e.g. directly disposed or supported) on the substrate. More preferably, the capture zone is disposed or supported (e.g. directly disposed or supported) at or near an inlet end of the substrate.

Alternatively, the catalytic zone may be disposed or supported (e.g. directly disposed or supported) at or near an inlet end of the substrate. It is preferred that the capture zone is disposed or supported (e.g. directly disposed or supported) on the substrate. More preferably, the capture zone is disposed or supported (e.g. directly disposed or supported) at or near an outlet end of the substrate.

Typically the catalytic zone has a length of 10 to 90% of the length of the substrate (e.g. 50 to 90%), preferably 15 to 80% of the length of the substrate (e.g. 55 to 80%), more preferably 20 to 75% (e.g. 30 to 65%) of the length of the substrate, still more preferably 30 to 65%.

The catalytic zone may adjoin the capture zone. Preferably, the catalytic zone is in contact with the capture zone. When the catalytic zone adjoins the capture zone or the catalytic zone is in contact with the capture zone, then the catalytic zone and the capture zone may be disposed or supported on the substrate as a layer (e.g. a single layer). Thus, a layer (e.g. a single) may be formed on the substrate when the catalytic and capture zones adjoin or are in contact with one another (see, for example, FIG. 3).

Additionally, the capture zone may overlap the catalytic zone. An end portion or part of the capture zone may be disposed or supported on the catalytic zone (see, for example, FIG. 6). The capture zone may only partly overlap the catalytic zone.

In an alternative arrangement of (ii), the catalytic zone may be separate from the capture zone. There may be a gap (e.g. a space) between the catalytic zone and the capture zone.

The gap between the catalytic zone and the capture zone may be less than 10 mm (e.g. relatively small) or ≥10 mm.

In (iii), the catalytic region is a first catalytic zone and a second catalytic zone.

The first catalytic zone is typically disposed or supported (e.g. directly disposed or supported) on the second catalytic zone. Preferably, the second catalytic zone is disposed or supported (e.g. directly disposed or supported) on the substrate.

Figure 4:
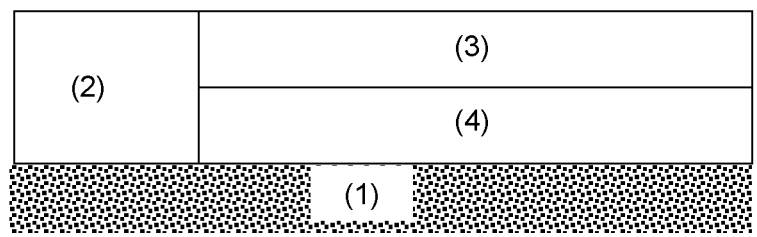
Figure 5:
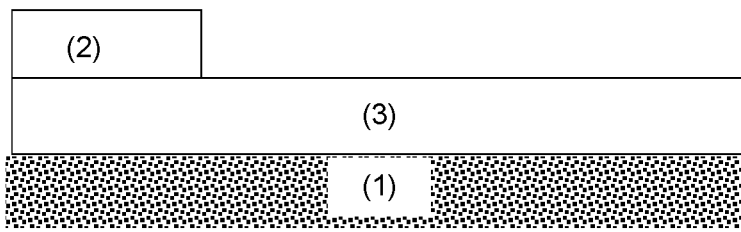
Figure 6:
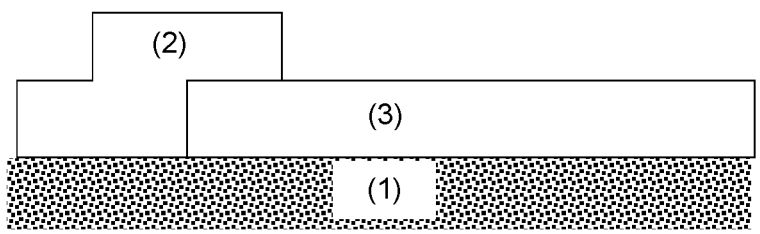

The first catalytic zone and the second catalytic zone may both be disposed or supported at or near an outlet end of the substrate (see FIG. 4).

Alternatively, the first catalytic zone and the second catalytic zone may both be disposed or supported at or near an inlet end of the substrate.

Typically, the capture zone is disposed or supported (e.g. directly disposed or supported) on the substrate.

Typically, the first catalytic zone has a length of 10 to 90% of the length of the substrate (e.g. 50 to 90%), preferably 15 to 80% of the length of the substrate (e.g. 55 to 80%), more preferably 20 to 75% (e.g. 30 to 65%) of the length of the substrate, still more preferably 30 to 65%.

The second catalytic zone typically has a length of 10 to 90% of the length of the substrate (e.g. 50 to 90%), preferably 15 to 80% of the length of the substrate (e.g. 55 to 80%), more preferably 20 to 75% (e.g. 30 to 65%) of the length of the substrate, still more preferably 30 to 65%.

When the catalytic region is a first catalytic zone and a second catalytic zone, it is preferred that the first catalytic zone comprise a support material, which is sulfur tolerant, such as described below.

In (iv), the catalytic region is a first catalytic zone and a second catalytic layer.

The capture zone may be disposed or supported on the second catalytic layer at or near an inlet end of the substrate (see FIG. 7). More preferably, the capture zone is directly disposed or supported on the second catalytic layer at or near an inlet end of the substrate. In this arrangement, the exhaust gas is brought into contact with the capture zone before it is brought into contact with most of the second catalytic layer.

Alternatively, the capture zone may be disposed or supported on the second catalytic layer at or near an outlet end of the substrate. More preferably, the capture zone is directly disposed or supported on the second catalytic layer at or near an outlet end of the substrate.

The second catalytic layer preferably extends for substantially an entire length of the substrate, particularly the entire length of the channels of a monolith substrate.

The second catalytic layer is preferably is disposed or supported (e.g. directly disposed or supported) on the substrate.

When the capture zone is disposed or supported on the second catalytic layer, it is preferred that the entire length of the capture zone is disposed or supported on the second catalytic layer. The length of the capture zone is less than the length of the second catalytic layer.

The first catalytic zone is preferably disposed or supported (e.g. directly disposed or supported) on the second catalytic layer. More preferably, the first catalytic zone is disposed or supported (e.g. directly disposed or supported) at or near the opposite end of the substrate to the capture zone (e.g. on the second catalytic layer), such as the outlet end or the inlet end.

Typically the first catalytic zone has a length of 10 to 90% of the length of the substrate (e.g. 50 to 90%), preferably 15 to 80% of the length of the substrate (e.g. 55 to 80%), more preferably 20 to 75% (e.g. 30 to 65%) of the length of the substrate, still more preferably 30 to 65%.

The capture zone may be disposed or supported upstream of the first catalytic zone (e.g. when the capture zone is disposed at or near an inlet end). In this arrangement, the exhaust gas is brought into contact with the capture zone before it is brought into contact with the first catalytic zone.

Alternatively, the capture zone may be disposed or supported downstream of the first catalytic zone (e.g. when the capture zone is disposed at or near an outlet end).

The first catalytic zone may adjoin the capture zone. Preferably, the first catalytic zone is in contact with the capture zone. When the first catalytic zone adjoins the capture zone or the first catalytic zone is in contact with the capture zone, then the first catalytic zone and the capture zone may be disposed or supported on the substrate as a layer (e.g. a single layer). Thus, a layer (e.g. a single) may be formed on the substrate when the first catalytic and capture zones adjoin or are in contact with one another.

Additionally, the capture zone may overlap the first catalytic zone. An end portion or part of the capture zone may be disposed or supported on the first catalytic zone. The capture zone may only partly overlap the catalytic zone.

Alternatively, the first catalytic zone may be separate from the capture zone. There may be a gap (e.g. a space) between the first catalytic zone and the capture zone. The gap between the first catalytic zone and the capture zone may be less than 10 mm (e.g. relatively small) or ≥10 mm.

In (v), the catalytic region is a first catalytic layer and a second catalytic layer.

The capture zone may be disposed or supported on the first catalytic layer at or near an inlet end of the substrate. More preferably, the capture zone is directly disposed or supported on the first catalytic layer at or near an inlet end of the substrate. In this arrangement, the exhaust gas is brought into contact with the capture zone before it is brought into contact with most of the first catalytic layer.

Alternatively, the capture zone may be disposed or supported on the first catalytic layer at or near an outlet end of the substrate. More preferably, the capture zone is directly disposed or supported on the first catalytic layer at or near an outlet end of the substrate.

The first catalytic layer may be disposed or supported (e.g. directly disposed or supported) on the second catalytic layer. The second catalytic layer may be disposed or supported (e.g. directly disposed or supported) on the substrate.

The first catalytic layer preferably extends for substantially an entire length of the substrate, particularly the entire length of the channels of a monolith substrate.

The second catalytic layer preferably extends for substantially an entire length of the substrate, particularly the entire length of the channels of a monolith substrate.

In general, when the oxidation catalyst comprises a second catalytic layer, then it is preferred that the first catalytic layer comprise a support material, which is sulfur tolerant, such as described below.

Figure 9:
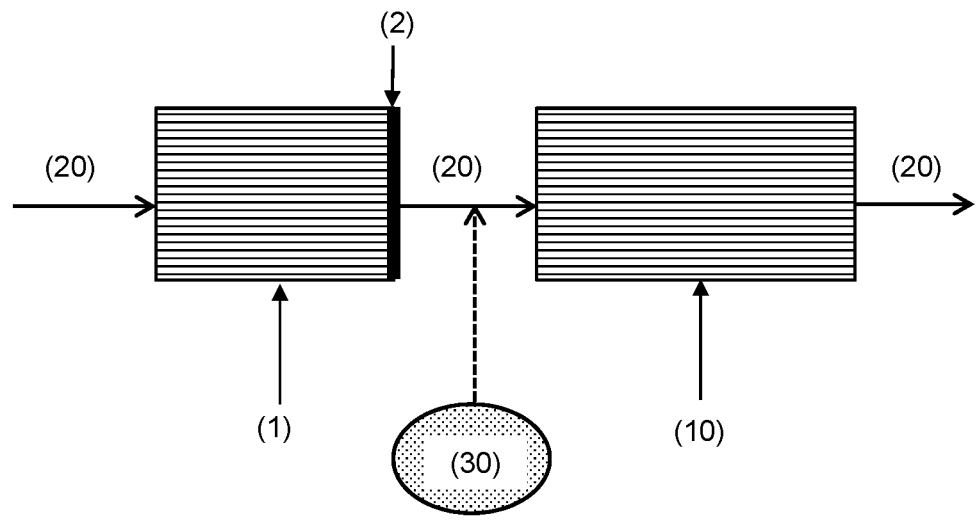
FIG. 9 is a schematic drawing showing an exhaust system arrangement of the invention. Exhaust gas (20) passes through an oxidation catalyst (1) of the invention, which has a capture material (2) disposed at an inlet end surface of the substrate. After exhaust gas (20) has passed through the oxidation catalyst (1), it may pass through a second emissions control device (10), such as a catalysed soot filter (CSF), a diesel particulate filter (DPF), a selective catalytic reduction (SCR) catalyst or a selective catalytic reduction filter (SCRF™) catalyst. If the second emissions control device (10) is an SCR or SCRF™ catalyst and active SCR is to be performed, then the exhaust system may comprise a source of ammonia (30) for introduction into the exhaust gas. For passive SCR, the source of ammonia (30) may not be present.
Figure 10:
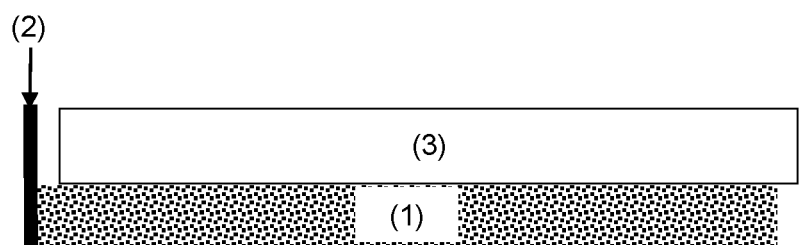

In a third oxidation catalyst arrangement, the substrate comprises an inlet end surface and an outlet end surface. The capture region is disposed or supported (e.g. directly disposed or supported) on an inlet end surface and/or an outlet end surface (i.e. of the substrate), preferably an inlet end surface, more preferably only an inlet end surface. See FIGS. 9 and 10.

In the third oxidation catalyst arrangement, the capture region may be referred to as a "capture face" because it is located on a face of the substrate The capture face may consist essentially of the capture material. It is preferred that the capture face preferably consists essentially of the capture material.

The capture face is preferably disposed or supported (e.g. directly disposed or supported) on an inlet end surface of the substrate (i.e. the upstream, end face of the substrate). The inlet end surface of a substrate typically comprises a plurality of channel wall edges.

The inlet end surface of the substrate may be planar (e.g. as in conventional honeycomb substrates) or non-planar. When the inlet end surface of the substrate is non-planar, then the inlet end surface may have a three-dimensional topographical configuration. Examples of substrates having a non-planar end surface are described in U.S. Pat. No. 8,257,659. Substrates having non-planar end surfaces may provide a larger surface area for the capture material to capture or trap at least one phosphorus containing impurity from the exhaust gas.

In general, it is preferred that the inlet end surface and/or the outlet end surface of the substrate is planar.

Figure 11:
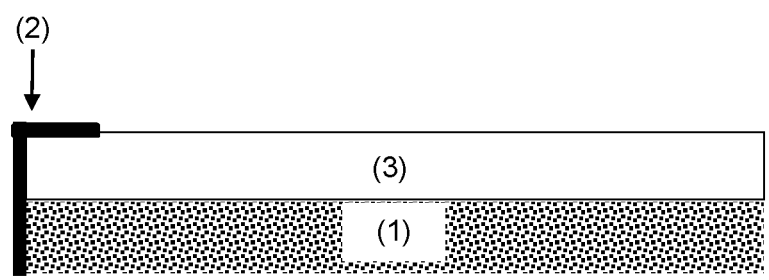

In addition to being disposed or supported on an inlet end surface of the substrate, the capture region may be disposed or supported within the substrate, such as on a plurality of channel walls or the catalytic region within the substrate. During application of the capture face, some of the capture material may enter the channels of the substrate thereby partially coating the channel walls within the substrate. See FIG. 11.

When the capture region is disposed or supported on a plurality of channel walls within the substrate, then the oxidation catalyst further comprises a capture zone. The capture zone has the same composition as the capture face (e.g. the capture zone comprises, or consists essentially of, the capture material).

In the third oxidation catalyst arrangement, the capture face typically has a mean length (e.g. from the inlet end surface of the substrate) of <25 mm, preferably ≤20 mm, such as ≤15 mm, more preferably ≤10 mm (e.g. ≤5 mm), and even more preferably ≤3 mm (e.g. <3 mm). For the avoidance of doubt, the mean length refers to a length in the axial direction of the substrate.

In the third oxidation catalyst arrangement, the catalytic region is generally disposed or supported (e.g. directly disposed or supported) within the substrate, such as on a plurality of channel walls within the substrate.

The catalytic region may be either (i) a catalytic layer, (ii) a first catalytic layer and a second catalytic layer, or (iii) a first catalytic zone and a second catalytic zone.

When the catalytic region is (i) a catalytic layer, the catalytic layer may be disposed or supported (e.g. directly disposed or supported) on the substrate. The catalytic layer is preferably a single catalytic layer.

The catalytic layer preferably extends for substantially an entire length of the substrate, particularly the entire length of the channels of a monolith substrate.

In (ii), the catalytic region is a first catalytic layer and a second catalytic layer. It is preferred that the first catalytic layer is disposed or supported (e.g. directly disposed or supported) on the second catalytic layer, and the second catalytic layer is disposed or supported (e.g. directly disposed or supported) on the substrate.

Each of the first catalytic layer and the second catalytic layer preferably extends for substantially an entire length of the substrate, particularly the entire length of the channels of a monolith substrate.

When the oxidation catalyst comprises a second catalytic layer, then it is preferred that the first catalytic layer comprise a support material, which is sulfur tolerant, such as described below.

In (iii), the catalytic region is a first catalytic zone and a second catalytic zone. The first catalytic zone and the second catalytic zone are preferably disposed or supported on the substrate, more preferably directly disposed or supported on the substrate.

The first catalytic zone typically has a length of 2.5 to 90% (e.g. 2.5 to 50% or 50 to 90%) of the length of the substrate, preferably 5 to 80% (e.g. 5 to 45% or 45 to 80%), particularly 10 to 75% (e.g. 10 to 40% or 40 to 75%) of the length of the substrate, more preferably 15 to 65% (e.g. 15 to 30% or 30 to 65%) of the length of the substrate.

Typically, the second catalytic zone has a length of 10 to 90% of the length of the substrate (e.g. 50 to 90%), preferably 15 to 80% of the length of the substrate (e.g. 55 to 80%), more preferably 20 to 75% (e.g. 30 to 65%) of the length of the substrate, still more preferably 30 to 65%.

It is generally preferred that the first catalytic zone is disposed or supported upstream of the second catalytic zone. More preferably, the first catalytic zone is disposed or supported at or near an inlet end of the substrate.

The first catalytic zone may adjoin the second catalytic zone. Preferably, the first catalytic zone is in contact with the second catalytic zone. When the first catalytic zone adjoins the second catalytic zone or the first catalytic zone is in contact with the second catalytic zone, then the first catalytic zone and the second catalytic zone may be disposed or supported on the substrate as a layer (e.g. a single layer). Thus, a layer (e.g. a single) may be formed on the substrate when the first and second catalytic zones adjoin or are in contact with one another.

The first catalytic zone may be separate from the second catalytic zone. There may be a gap (e.g. a space) between the first catalytic zone and the second catalytic zone.

Alternatively, the first catalytic zone may overlap the second catalytic zone. An end portion or part of the first catalytic zone may be disposed or supported on the second catalytic zone. The first catalytic zone generally only partly overlaps the second catalytic zone.

In general, it may be preferable that the first catalytic zone comprises a support material, which is sulfur tolerant, such as described below.

The composition of the catalytic region is described below. When the catalytic region is a first catalytic region (e.g. a first catalytic layer or a first catalytic zone) and a second catalytic region (e.g. a second catalytic layer or a second catalytic zone), then any reference to the composition of the "catalytic region" refers to the composition of the "first catalytic region". Thus, any reference below to the "catalytic region" is equally applicable to the "first catalytic region".

The catalytic region comprises a catalytic material comprising a platinum group metal (PGM) selected from the group consisting of platinum (Pt), palladium (Pd) and a combination of platinum (Pt) and palladium (Pd). The PGM may be Pt. The PGM may be Pd. The PGM may be a combination of Pt and Pd.

Typically, the catalytic material further comprises a support material. The support material of the catalytic material is referred to herein by the expression "CM support material" or the "first CM support material" when a "second CM support material" is present.

The platinum group metal (PGM) is preferably disposed or supported on the CM support material. More preferably, the platinum group metal (PGM) is disposed directly onto or is directly supported on the CM support material (e.g. there is no intervening material between the PGM and the CM support material). For example, the PGM can be dispersed over a surface of and/or impregnated within the CM support material.

The CM support material comprises, or consists essentially of, a refractory oxide (referred to herein as the refractory oxide of the catalytic material). Particles of the refractory oxide typically have a mean specific surface area ≥75 m²/g, such as ≥100 m²/g, and preferably ≥100 m²/g.

The refractory oxide may be selected from the group consisting of alumina, silica, titania, zirconia, ceria and a mixed or composite oxide of at least one refractory oxide thereof. The refractory oxide may be selected from the group consisting of alumina, silica, titania, zirconia, ceria, silica-alumina, titania-alumina, zirconia-alumina, ceria-alumina, titania-silica, zirconia-silica, zirconia-titania, ceria-zirconia, ceria-zirconia-alumina and alumina-magnesium oxide.

In general, it is preferable that the refractory oxide comprises, or consists essentially, of alumina, silica or silica-alumina, especially alumina.

When the refractory oxide of the CM support material comprises or consists essentially of a mixed or composite oxide of alumina (e.g. silica-alumina, alumina-magnesium oxide or a mixture of alumina and ceria), then preferably the mixed or composite oxide of alumina comprises at least 50 to 99% by weight of alumina, more preferably 70 to 95% by weight of alumina, even more preferably 75 to 90% by weight of alumina.

When the refractory oxide of the CM support material comprises or consists essentially of ceria-zirconia, then the ceria-zirconia may consist essentially of 20 to 95% by weight of ceria and 5 to 80% by weight of zirconia (e.g. 50 to 95% by weight ceria and 5 to 50% by weight zirconia), preferably 35 to 80% by weight of ceria and 20 to 65% by weight zirconia (e.g. 55 to 80% by weight ceria and 20 to 45% by weight zirconia), even more preferably 45 to 75% by weight of ceria and 25 to 55% by weight zirconia.

The refractory oxide of the CM support material may optionally be doped (e.g. with a dopant). The dopant may be selected from the group consisting of zirconium (Zr), titanium (Ti), silicon (Si), yttrium (Y), lanthanum (La), praseodymium (Pr), samarium (Sm), neodymium (Nd) and an oxide thereof.

When the refractory oxide of the CM support material is doped, the total amount of dopant is 0.25 to 5% by weight, preferably 0.5 to 3% by weight (e.g. about 1% by weight).

The refractory oxide of the CM support material may comprise or consist essentially of alumina doped with a dopant. The alumina may be doped with a dopant comprising silicon (Si), magnesium (Mg), barium (Ba), lanthanum (La), cerium (Ce), titanium (Ti), or zirconium (Zr) or a combination of two or more thereof. The dopant may comprise, or consist essentially of, an oxide of silicon (e.g. silica), an oxide of magnesium (e.g. magnesium oxide), an oxide of lanthanum (e.g. lanthana), an oxide of cerium (e.g. ceria), an oxide of titanium (e.g. titania) or an oxide of zirconium (e.g. zirconia). Preferably, the dopant comprises, or consists essentially of, silicon, magnesium, cerium, or an oxide thereof, particularly silicon, or cerium, or an oxide thereof. More preferably, the dopant comprises, or consists essentially of, silicon, magnesium or an oxide thereof; particularly silicon, magnesium, or an oxide thereof; especially silicon or an oxide thereof.

When the alumina is alumina doped with silica, then the alumina is doped with silica in a total amount of 0.5 to 45% by weight (i.e. % by weight of the alumina), preferably 1 to 40% by weight, more preferably 1.5 to 30% by weight (e.g. 1.5 to 10% by weight), particularly 2.5 to 25% by weight, more particularly 3.5 to 20% by weight (e.g. 5 to 20% by weight), even more preferably 4.5 to 15% by weight.

When the alumina is alumina doped with magnesium oxide, then the alumina is doped with magnesium oxide in an amount as defined above or an amount of 1 to 40% by weight (i.e. % by weight of the alumina), such as 5 to 28% by weight. More preferably, the alumina is doped with magnesium oxide in amount of 10 to 25% by weight.

It may be preferable that the refractory oxide of the CM support material comprises, or consists essentially of, titania ($TiO_2$). It has been found that titania-based support materials are sulfur tolerant and may advantageously be used when the engine is run on a fuel, such as a diesel or biodiesel, containing a high content of sulfur.

The catalytic material may comprise a single platinum group metal (PGM) (i.e. this is the only platinum group metal). The single platinum group metal may be platinum. The single platinum group metal may be palladium.

When the PGM is a combination of platinum and palladium, then typically the catalytic region or the catalytic material thereof comprises a ratio by weight of Pt to Pd of 20:1 to 1:20 (e.g. 15:1 to 1:15), preferably 10:1 to 1:10 (e.g. 7.5:1 to 1:7.5), more preferably 5:1 to 1:5 (e.g. 3:1 to 1:3), and even more preferably 2.5:1 to 1:1.

In general, it is preferable that the catalytic region or the catalytic material thereof comprises Pt and Pd, then typically the ratio by mass of Pt to Pd is ≥1:1. The catalytic material may comprise Pt and optionally Pd, such that the ratio by mass of Pt to Pd is from 1:0 to 1:1. The ratio by mass (i.e. mass ratio) of Pt to Pd is preferably 50:1 to 1:1, more preferably 30:1 to 2:1 (e.g. 25:1 to 4:1), even more preferably 20:1 to 5:1, such as 15:1 to 7.5:1.

It is preferred that when the catalytic region or the catalytic material thereof comprises Pt and Pd, then the ratio by mass of Pt to Pd is ≥1.5:1, more preferably ≥2:1 (e.g. ≥3:1), even more preferably ≥4:1, such as ≥10:1.

Typically, the oxidation catalyst has a total loading of PGM of 5 to 500 g ft$^{-3}$. Preferably, the total loading of PGM is 10 to 400 g ft$^{-3}$, more preferably 20 to 350 g ft$^{-3}$, still more preferably 40 to 300 g ft$^{-3}$, and even more preferably 50 to 250 g ft$^{-3}$.

In general, it is preferred that the catalytic region or the oxidation catalyst (e.g. the emissions control device as a whole) is substantially free of rhodium. More preferably, the catalytic region or the oxidation catalyst does not comprise rhodium. Rhodium is often included in three way conversion catalysts or lean $NO_x$ traps. The oxidation catalyst of the invention is a diesel oxidation catalyst and is used primarily for the oxidation of carbon monoxide and unburned hydrocarbons.

Additionally or alternatively, the catalytic region or the oxidation catalyst is substantially free of an alkaline earth metal. More preferably, the catalytic region or the oxidation catalyst does not comprise an alkaline earth metal. When the capture material comprises an alkaline earth metal, then the oxidation catalyst does not comprise an alkaline earth metal except for the alkaline earth metal of the capture material. Alkaline earth metals are sometimes included in three way conversion catalysts or lean $NO_x$ traps.

The catalytic region or the oxidation catalyst may be substantially free of a zeolite for absorbing hydrocarbons. More preferably, the catalytic region or the oxidation catalyst does not comprise a zeolite for absorbing hydrocarbons. For heavy duty diesel applications, the inclusion of a zeolite for absorbing hydrocarbons is not always necessary.

The second catalytic region typically comprises, or consists essentially of, a platinum group metal (PGM) and a support material. The support material of the second catalytic material is referred to herein by the expression "second CM support material".

The platinum group metal (PGM) of the second catalytic region may be referred to herein as the "second platinum group metal (PGM)" to distinguish it from the platinum group metal (PGM) of the "catalytic region" or the "first catalytic region" described above.

The term "second" in the expression "second platinum group metal (PGM)" is a label and does not restrict the number of platinum group metals that must be present. Similarly, the support material of the second catalytic region may be referred to herein as the "second CM support material" to distinguish it from the support material of the "catalytic region" or the "first catalytic region" described above. The term "second" in the expression "second support material" is a label and does not restrict the number of support materials that must be present.

The second platinum group metal (PGM) is preferably disposed or supported on the second CM support material. More preferably, the second PGM is disposed directly onto or is directly supported on the second CM support material (e.g. there is no intervening material between the second PGM and the second CM support material). For example, the second PGM can be dispersed over a surface of and/or impregnated within the second CM support material.

The second catalytic region typically has a different composition to the first catalytic region.

It is preferable that the second catalytic region is substantially free of the capture material. More preferably, the second catalytic region does not comprise the capture material.

In general, the second catalytic region has a uniform composition (e.g. homogenous composition).

The second PGM may be selected from the group consisting of platinum (Pt), palladium (Pd) and a combination of platinum (Pt) and palladium (Pd). The second PGM may be Pt. The second PGM may be Pd. The second PGM may be a combination of Pt and Pd.

The second catalytic region may comprise a single platinum group metal (PGM) (i.e. the second PGM is the only platinum group metal). The single platinum group metal may be platinum. The single platinum group metal may be palladium.

When the second PGM is a combination of platinum and palladium, then typically the second catalytic region comprises a ratio by weight of Pt to Pd of 20:1 to 1:20 (e.g. 15:1 to 1:15), preferably 10:1 to 1:10 (e.g. 7.5:1 to 1:7.5), more preferably 5:1 to 1:5 (e.g. 3:1 to 1:3), and even more preferably 2.5:1 to 1:1.

It may be preferable that the second catalytic region comprises Pt and Pd in a ratio by mass of Pt to Pd of ≤4:1. The second catalytic region may comprise Pd and optionally Pt, such that the ratio by mass of Pd to Pt is 20:1 to 1:4. The ratio by mass (i.e. mass ratio) of Pd to Pt is preferably 15:1 to 1:2, more preferably 10:1 to 1:1.5, even more preferably 5:1 to 1:1.

Typically, the second catalytic region has a total loading of second PGM of 5 to 250 g ft$^{-3}$. Preferably, the total loading of PGM is 10 to 200 g ft$^{-3}$, more preferably 15 to 175 g ft$^{-3}$, still more preferably 20 to 150 g ft$^{-3}$, and even more preferably 25 to 125 g ft$^{-3}$.

The second CM support material comprises, or consists essentially of, a refractory oxide. Particles of the refractory oxide typically have a mean specific surface area ≥75 m$^2$/g, such as ≥100 m$^2$/g, and preferably ≥100 m$^2$/g.

The refractory oxide may be selected from the group consisting of alumina, silica, titania, zirconia, ceria and a mixed or composite oxide of at least one refractory oxide thereof. The refractory oxide may be selected from the group consisting of alumina, silica, titania, zirconia, ceria, silica-alumina, titania-alumina, zirconia-alumina, ceria-alumina, titania-silica, zirconia-silica, zirconia-titania, ceria-zirconia and alumina-magnesium oxide.

It is preferred that the refractory oxide of the second CM support material comprises, or consists essentially of, alumina, silica or silica-alumina.

When the refractory oxide of the second CM support material comprises or consists essentially of a mixed or composite oxide of alumina (e.g. silica-alumina, alumina-magnesium oxide or a mixture of alumina and ceria), then preferably the mixed or composite oxide of alumina comprises at least 50 to 99% by weight of alumina, more preferably 70 to 95% by weight of alumina, even more preferably 75 to 90% by weight of alumina.

When the refractory oxide of the second CM support material comprises or consists essentially of ceria-zirconia, then the ceria-zirconia may consist essentially of 20 to 95% by weight of ceria and 5 to 80% by weight of zirconia (e.g. 50 to 95% by weight ceria and 5 to 50% by weight zirconia), preferably 35 to 80% by weight of ceria and 20 to 65% by weight zirconia (e.g. 55 to 80% by weight ceria and 20 to 45% by weight zirconia), even more preferably 45 to 75% by weight of ceria and 25 to 55% by weight zirconia.

The refractory oxide of the second CM support material may optionally be doped (e.g. with a dopant). The dopant may be selected from the group consisting of zirconium (Zr), titanium (Ti), silicon (Si), yttrium (Y), lanthanum (La), praseodymium (Pr), samarium (Sm), neodymium (Nd) and an oxide thereof.

When the refractory oxide of the second CM support material, the total amount of dopant is 0.25 to 5% by weight, preferably 0.5 to 3% by weight (e.g. about 1% by weight).

The refractory oxide of the second CM support material may comprise or consist essentially of alumina doped with a dopant. The alumina may be doped with a dopant comprising silicon (Si), magnesium (Mg), barium (Ba), lanthanum (La), cerium (Ce), titanium (Ti), or zirconium (Zr) or a combination of two or more thereof. The dopant may comprise, or consist essentially of, an oxide of silicon (e.g. silica), an oxide of magnesium (e.g. magnesium oxide), an oxide of lanthanum (e.g. lanthana), an oxide of cerium (e.g. ceria), an oxide of titanium (e.g. titania) or an oxide of zirconium (e.g. zirconia). Preferably, the dopant comprises, or consists essentially of, silicon, magnesium, cerium, or an oxide thereof, particularly silicon, or cerium, or an oxide thereof. More preferably, the dopant comprises, or consists essentially of, silicon, magnesium or an oxide thereof; particularly silicon, magnesium, or an oxide thereof; especially silicon or an oxide thereof.

When the alumina is alumina doped with silica, then the alumina is doped with silica in a total amount of 0.5 to 45% by weight (i.e. % by weight of the alumina), preferably 1 to 40% by weight, more preferably 1.5 to 30% by weight (e.g. 1.5 to 10% by weight), particularly 2.5 to 25% by weight, more particularly 3.5 to 20% by weight (e.g. 5 to 20% by weight), even more preferably 4.5 to 15% by weight.

When the alumina is alumina doped with magnesium oxide, then the alumina is doped with magnesium oxide in an amount as defined above or an amount of 1 to 40% by weight (i.e. % by weight of the alumina), such as 5 to 28% by weight. More preferably, the alumina is doped with magnesium oxide in amount of 10 to 25% by weight.

The second catalytic region may further comprise a hydrocarbon adsorbent. The hydrocarbon adsorbent is preferably a zeolite.

Examples of suitable zeolites or types of zeolite include faujasite, clinoptilolite, mordenite, silicalite, ferrierite, zeolite X, zeolite Y, ultrastable zeolite Y, AEI zeolite, ZSM-5 zeolite, ZSM-12 zeolite, ZSM-20 zeolite, ZSM-34 zeolite, CHA zeolite, SSZ-3 zeolite, SAPO-5 zeolite, offretite, a beta zeolite or a copper CHA zeolite. The zeolite is preferably ZSM-5, a beta zeolite or a Y zeolite.

When the hydrocarbon adsorbent is a zeolite, then preferably the zeolite is a medium pore zeolite or a large pore zeolite.

When the second catalytic region comprises a hydrocarbon adsorbent, the second catalytic region has a total amount of hydrocarbon adsorbent of 0.05 to 3.00 g in$^{-3}$, particularly 0.10 to 2.00 g in$^{-3}$, more particularly 0.2 to 0.8 g in$^{-3}$. For example, the total amount of hydrocarbon adsorbent may be 0.8 to 1.75 g in$^{-3}$, such as 1.0 to 1.5 g in$^{-3}$.

In general, it is preferred that the second catalytic region is substantially free of rhodium. More preferably, the second catalytic region does not comprise rhodium.

Additionally or alternatively, the second catalytic region is substantially free of an alkaline earth metal. More preferably, the second catalytic region does not comprise an alkaline earth metal.

It may be preferable that the second catalytic region is substantially free of a hydrocarbon adsorbent, particularly a zeolite (e.g. for absorbing hydrocarbons). More preferably, the second catalytic region does not comprise a hydrocarbon adsorbent, particularly a zeolite (e.g. for absorbing hydrocarbons).

In general (including any one of the oxidation catalyst arrangements mentioned above), the oxidation catalyst may be a diesel oxidation catalyst (DOC), a catalysed soot filter (CSF), a diesel exotherm catalyst (DEC), a $NO_x$ storage catalyst (NSC) or a passive NOx adsorber (PNA). It is preferred that the oxidation catalyst is a DOC, DEC or a CSF. More preferably, the oxidation catalyst is a DOC or a DEC, even more preferably the oxidation catalyst is a DOC.

Substrates for supporting oxidation catalysts are well known in the art. Methods for making washcoats to apply the catalytic material or capture material onto a substrate and methods for applying washcoats onto a substrate are also known in the art (see, for example, WO 99/47260, WO 2007/077462 and WO 2011/080525).

The substrate typically has a plurality of channels (e.g. for the exhaust gas to flow through). Generally, the substrate is a ceramic material or a metallic material.

It is preferred that the substrate is made or composed of cordierite ($SiO_2$—$Al_2O_3$—$MgO$), silicon carbide (SiC), Fe—Cr—Al alloy, Ni—Cr—Al alloy, or a stainless steel alloy.

The substrate may, for example, have a tubular, fibrous or particulate form. Examples of suitable supporting substrates include a substrate of the monolithic honeycomb cordierite type, a substrate of the monolithic honeycomb SiC type, a substrate of the layered fibre or knitted fabric type, a substrate of the foam type, a substrate of the crossflow type, a substrate of the metal wire mesh type, a substrate of the metal porous body type and a substrate of the ceramic particle type.

Typically, the substrate is a monolith (also referred to herein as a monolith substrate). Such monolith substrates are well-known in the art.

The monolith substrate may be a flow-through monolith substrate. Alternatively, the monolith substrate may be a filtering monolith substrate. It is preferred that the monolith substrate is a flow-through monolith substrate.

A flow-through monolith substrate typically comprises a honeycomb monolith (e.g. a metal or ceramic honeycomb monolith) having a plurality of channels extending therethrough, which channels are open at both ends. When the substrate is a flow-through monolith substrate, then the oxidation catalyst of the invention is typically a diesel oxidation catalyst (DOC), a diesel exotherm catalyst (DEC), a $NO_x$ storage catalyst (NSC) or a passive $NO_x$ adsorber (PNA). It is preferred that the oxidation catalyst of the invention is a DOC.

A filtering monolith substrate generally comprises a plurality of inlet channels and a plurality of outlet channels, wherein the inlet channels are open at an upstream end (i.e. exhaust gas inlet side) and are plugged or sealed at a downstream end (i.e. exhaust gas outlet side), the outlet channels are plugged or sealed at an upstream end and are open at a downstream end, and wherein each inlet channel is separated from an outlet channel by a porous structure. When the substrate is a filtering monolith substrate, then the oxidation catalyst of the invention is typically a catalysed soot filter (CSF), a $NO_x$ storage catalyst (NSC) on a filter or a passive $NO_x$ adsorber (PNA) on filter, preferably a catalysed soot filter (CSF).

When the monolith substrate is a filtering monolith substrate, it is preferred that the filtering monolith substrate is a wall-flow filter. In a wall-flow filter, each inlet channel is alternately separated from an outlet channel by a wall of the porous structure and vice versa. It is preferred that the inlet channels and the outlet channels are arranged in a honeycomb arrangement. When there is a honeycomb arrangement, it is preferred that the channels vertically and laterally adjacent to an inlet channel are plugged at an upstream end and vice versa (i.e. the channels vertically and laterally adjacent to an outlet channel are plugged at a downstream end). When viewed from either end, the alternately plugged and open ends of the channels take on the appearance of a chessboard.

When the oxidation catalyst of the invention is a catalysed soot filter (CSF), then both the catalytic region (or catalytic layer or catalytic zone) and the capture region (or capture layer or capture zone) may be disposed or supported on (i) a plurality of inlet channel walls of the substrate, and/or (ii) a plurality of outlet channel walls of the substrate.

Alternatively, it preferred that when the oxidation catalyst of the invention is a catalysed soot filter (CSF), then the catalytic region (or catalytic layer or catalytic zone) is disposed or supported on a plurality of outlet channel walls of the substrate, and the capture region (or capture layer or capture zone) is disposed or supported on a plurality of inlet channel walls of the substrate.

The substrate, particularly the monolith substrate, preferably has a diameter of ≥7 inches (e.g. ≥17.8 cm). Such monolith substrates tend to be used in heavy duty diesel applications.

The catalyst volume (e.g. from all of the coatings (i.e. the capture region, catalytic region) applied to the monolith substrate) is typically ≥2.0 L, more preferably ≥2.5 L.

The invention further relates to an exhaust system for treating an exhaust gas produced by a diesel engine. The exhaust system comprises the oxidation catalyst of the invention and an emissions control device. The emissions control device is preferably downstream of the oxidation catalyst.

Examples of an emissions control device include a diesel particulate filter (DPF), a $NO_x$ storage catalyst (NSC), a lean $NO_x$ catalyst (LNC), a selective catalytic reduction (SCR) catalyst, a diesel oxidation catalyst (DOC), a catalysed soot filter (CSF), a selective catalytic reduction filter (SCRF™) catalyst, an ammonia slip catalyst (ASC) and combinations of two or more thereof. Such emissions control devices are all well known in the art.

It is preferred that the exhaust system comprises an emissions control device selected from the group consisting of a $NO_x$ storage catalyst (NSC), an ammonia slip catalyst (ASC), diesel particulate filter (DPF), a selective catalytic reduction (SCR) catalyst, a catalysed soot filter (CSF), a selective catalytic reduction filter (SCRF™) catalyst, and combinations of two or more thereof. More preferably, the emissions control device is selected from the group consisting of a diesel particulate filter (DPF), a selective catalytic reduction (SCR) catalyst, a catalysed soot filter (CSF), a selective catalytic reduction filter (SCRF™) catalyst, and combinations of two or more thereof. Even more preferably, the emissions control device is a selective catalytic reduction (SCR) catalyst or a selective catalytic reduction filter (SCRF™) catalyst.

In general, when the exhaust system comprises a selective catalytic reduction (SCR) catalyst or a selective catalytic reduction filter (SCRF™) catalyst, the selective catalytic reduction (SCR) catalyst or a selective catalytic reduction filter (SCRF™) catalyst comprises Fe or Cu supported on a molecular sieve, such as described below, more preferably Cu supported on a molecular sieve.

When the exhaust system of the invention comprises an SCR catalyst or an SCRF™ catalyst, then the exhaust system may further comprise an injector for injecting a nitrogenous reductant, such as ammonia, or an ammonia precursor, such as urea or ammonium formate, preferably urea, into exhaust gas upstream of the SCR catalyst or the SCRF™ catalyst. Typically, the injector is downstream of the oxidation catalyst. Such an injector may be fluidly linked to a source (e.g. a tank) of a nitrogenous reductant precursor. Valve-controlled dosing of the precursor into the exhaust gas may be regulated by suitably programmed engine management means and closed loop or open loop feedback provided by sensors monitoring the composition of the exhaust gas. Ammonia can also be generated by heating ammonium carbamate (a solid) and the ammonia generated can be injected into the exhaust gas.

Alternatively or in addition to the injector, ammonia can be generated in situ (e.g. during rich regeneration of a NSC disposed upstream of the SCR catalyst or the SCRF™ catalyst). Thus, the exhaust system may further comprise an engine management means for enriching the exhaust gas with hydrocarbons.

The SCR catalyst or the SCRF™ catalyst may comprise a metal selected from the group consisting of at least one of Cu, Hf, La, Au, In, V, lanthanides and Group VIII transition metals (e.g. Fe), wherein the metal is supported on a refractory oxide or a molecular sieve. The metal is preferably selected from Ce, Fe, Cu and combinations of any two or more thereof, more preferably the metal is Fe or Cu.

The refractory oxide for the SCR catalyst or the SCRF™ catalyst may be selected from the group consisting of $Al_2O_3$, $TiO_2$, $CeO_2$, $SiO_2$, $ZrO_2$ and mixed oxides containing two or more thereof. The non-zeolite catalyst can also include tungsten oxide (e.g. $V_2O_5/WO_3/TiO_2$, $WO_x/CeZrO_2$, $WO_x/ZrO_2$ or $Fe/WO_x/ZrO_2$).

It is particularly preferred when an SCR catalyst, an SCRF™ catalyst or a washcoat thereof comprises at least one molecular sieve, such as an aluminosilicate zeolite or a SAPO. The at least one molecular sieve can be a small, a medium or a large pore molecular sieve. By "small pore molecular sieve" herein we mean molecular sieves containing a maximum ring size of 8, such as CHA; by "medium pore molecular sieve" herein we mean a molecular sieve containing a maximum ring size of 10, such as ZSM-5; and by "large pore molecular sieve" herein we mean a molecular sieve having a maximum ring size of 12, such as beta. Small pore molecular sieves are potentially advantageous for use in SCR catalysts.

In the exhaust system of the invention, preferred molecular sieves for an SCR catalyst or an SCRF™ catalyst are synthetic aluminosilicate zeolite molecular sieves selected from the group consisting of AEI, ZSM-5, ZSM-20, ERI including ZSM-34, mordenite, ferrierite, BEA including Beta, Y, CHA, LEV including Nu-3, MCM-22 and EU-1, preferably AEI or CHA, and having a silica-to-alumina ratio of about 10 to about 50, such as about 15 to about 40.

The oxidation catalyst of the invention is preferably directly coupled to (e.g. directly downstream of) an exhaust manifold of the diesel engine. When the oxidation catalyst is directly coupled to the exhaust manifold, there is no emissions control device between the oxidation catalyst of the invention and the exhaust manifold. Thus, the oxidation catalyst of the invention is the first emissions control device encountered by the exhaust gas produced by the diesel engine.

The oxidation catalyst may be close-coupled to an exhaust manifold of the diesel engine.

In a first exhaust system arrangement, the exhaust system comprises the oxidation catalyst of the invention and a selective catalytic reduction filter (SCRF™) catalyst. The oxidation catalyst of the invention is typically followed by (e.g. is upstream of) the selective catalytic reduction filter (SCRF™) catalyst.

A nitrogenous reductant injector may be arranged between the oxidation catalyst and the selective catalytic reduction filter (SCRF™) catalyst. Thus, the oxidation catalyst may be followed by (e.g. is upstream of) a nitrogenous reductant injector, and the nitrogenous reductant injector may be followed by (e.g. is upstream of) the selective catalytic reduction filter (SCRF™) catalyst.

In a second exhaust system arrangement, the exhaust system comprises the oxidation catalyst of the invention and a selective catalytic reduction (SCR) catalyst, and optionally either a catalysed soot filter (CSF) or a diesel particulate filter (DPF). The oxidation catalyst is typically followed by (e.g. is upstream of) the selective catalytic reduction (SCR) catalyst.

A nitrogenous reductant injector may be arranged between the oxidation catalyst and the selective catalytic reduction (SCR) catalyst. Thus, the oxidation catalyst may be followed by (e.g. is upstream of) a nitrogenous reductant injector, and the nitrogenous reductant injector may be followed by (e.g. is upstream of) the selective catalytic reduction (SCR) catalyst. The selective catalytic reduction (SCR) catalyst may be followed by (e.g. are upstream of) the catalysed soot filter (CSF) or the diesel particulate filter (DPF).

In a third exhaust system arrangement, the exhaust system comprises the oxidation catalyst of the invention and a catalysed soot filter (CSF). The oxidation catalyst is typically followed by (e.g. is upstream of) the catalysed soot filter (CSF). Thus, for example, an outlet of the oxidation catalyst is connected to an inlet of the catalysed soot filter.

In a fourth exhaust system arrangement, the exhaust system comprises the oxidation catalyst of the invention, a catalysed soot filter (CSF) and a selective catalytic reduction (SCR) catalyst. The oxidation catalyst is typically followed by (e.g. is upstream of) the catalysed soot filter (CSF). The catalysed soot filter is typically followed by (e.g. is upstream of) the selective catalytic reduction (SCR) catalyst.

A nitrogenous reductant injector may be arranged between the catalysed soot filter (CSF) and the selective catalytic reduction (SCR) catalyst. Thus, the catalysed soot filter (CSF) may be followed by (e.g. is upstream of) a nitrogenous reductant injector, and the nitrogenous reductant injector may be followed by (e.g. is upstream of) the selective catalytic reduction (SCR) catalyst.

In any of the embodiments of the first, second or fourth exhaust system arrangements described hereinabove, an ASC can be disposed downstream from the SCR catalyst or the SCRF™ catalyst (i.e. as a separate substrate monolith), or more preferably as a zone on a downstream or trailing end of the substrate monolith comprising the SCR catalyst can be used as a support for the ASC.

The invention further provides a vehicle. The vehicle comprises a diesel engine and either an oxidation catalyst or an exhaust system of the invention.

The diesel engine is typically a conventional (i.e. traditional) diesel engine.

The vehicle may be a light-duty diesel vehicle (LDV), such as defined in US or European legislation. A light-duty diesel vehicle typically has a weight of <2840 kg, more preferably a weight of <2610 kg.

In the US, a light-duty diesel vehicle (LDV) refers to a diesel vehicle having a gross weight of ≤8,500 pounds (US lbs). In Europe, the term light-duty diesel vehicle (LDV) refers to (i) passenger vehicles comprising no more than eight seats in addition to the driver's seat and having a maximum mass not exceeding 5 tonnes, and (ii) vehicles for the carriage of goods having a maximum mass not exceeding 12 tonnes.

It is preferred that the vehicle is a heavy-duty diesel vehicle (HDV), such as a diesel vehicle having a gross weight of >8,500 pounds (US lbs), as defined in US legislation.

The exhaust gas may be produced by a diesel engine run on diesel fuel (e.g. conventional petroleum-derived diesel fuel often known as petrodiesel) or a biodiesel fuel. The biodiesel fuel may be B100 (e.g. 100% biodiesel) or it may be a blend of biodiesel and petrodiesel, such as B6 to B20 (e.g. 6 to 20% biodiesel and 80 to 94% petrodiesel, such as set out in ASTM D7467). Biodiesel often contains sulfur-containing impurities.

It may be preferable that, in the oxidation catalyst of the invention, the support material of the catalytic region/first catalytic region is sulfur tolerant.

The diesel engine may be run on a diesel fuel comprising 50 ppm of sulfur, more preferably ≤15 ppm of sulfur, such as 10 ppm of sulfur, and even more preferably ≤5 ppm of sulfur. Such diesel fuels are often referred to as "ultra-low-sulfur diesel" (ULSD).

Alternatively, the diesel engine may be run on a fuel, such as a diesel fuel, comprising >50 ppm of sulfur, such as >200 ppm (e.g. 250 to 2000 ppm) of sulfur. When the diesel engine is run on such a diesel fuel, it may be preferable that, in the oxidation catalyst of the invention, the support material of the catalytic region/first catalytic region is sulfur tolerant.

DEFINITIONS

The term "mixed oxide" as used herein generally refers to a mixture of oxides in a single phase, as is conventionally known in the art. The term "composite oxide" as used herein generally refers to a composition of oxides having more than one phase, as is conventionally known in the art.

For the avoidance of doubt, the term "combination of platinum (Pt) and palladium (Pd)" as used herein in relation to a region, zone or layer refers to the presence of both platinum and palladium in the region, the zone or the layer. The word "combination" does not require that the platinum and palladium are present as a mixture or an alloy, although such a mixture or alloy is embraced by this term.

The acronym "PGM" as used herein refers to "platinum group metal". The term "platinum group metal" generally refers to a metal selected from the group consisting of Ru, Rh, Pd, Os, Ir and Pt, preferably a metal selected from the group consisting of Ru, Rh, Pd, Ir and Pt, unless otherwise specified.

The expression "on the substrate" as used herein, in the context of a region, layer or zone being "disposed or supported on the substrate", generally refers to the region, layer or zone being located on a surface of a channel wall within the substrate, unless specified otherwise.

The expression "end surface" as used herein, particularly with reference to an "inlet end surface" or an "outlet end surface", is synonymous with the expression "end face". The end surface or end face of a substrate is typically formed by the wall edges (e.g. at an exterior surface of the substrate) that define or bound the channels through the substrate.

The term "region" as used herein refers to an area on a substrate, typically obtained by drying and/or calcining a washcoat. A "region" can, for example, be disposed or supported on a substrate as a "layer" or a "zone". The area or arrangement on a substrate is generally controlled during the process of applying the washcoat to the substrate. The "region" typically has distinct boundaries or edges (i.e. it is possible to distinguish one region from another region using conventional analytical techniques).

Typically, the "region" has a substantially uniform length. The reference to a "substantially uniform length" in this context refers to a length that does not deviate (e.g. the difference between the maximum and minimum length) by more than 10%, preferably does not deviate by more than 5%, more preferably does not deviate by more than 1%, from its mean value.

It is preferable that each "region" has a substantially uniform composition (i.e. there is no substantial difference in composition when comparing one part of the region with another part of that region), unless the context requires otherwise. More preferably, each zone or layer has a substantially uniform composition (e.g. a homogenous composition). Substantially uniform composition in this context refers to a material (e.g. region) where the difference in composition when comparing one part of the region with another part of the region is 5% or less, usually 2.5% or less, and most commonly 1% or less.

The term "zone" as used herein refers to a region having a length that is less than the total length of the substrate, such as ≤75% of the total length of the substrate. A "zone" typically has a length (i.e. a substantially uniform length) of at least 5% (e.g. ≥5%) of the total length of the substrate.

The total length of a substrate is the distance between its inlet end and its outlet end (e.g. the opposing ends of the substrate).

Any reference to a "zone disposed at an inlet end of the substrate" used herein refers to a zone disposed or supported on a substrate where the zone is nearer to an inlet end of the substrate than the zone is to an outlet end of the substrate. Thus, the midpoint of the zone (i.e. at half its length) is nearer to the inlet end of the substrate than the midpoint is to the outlet end of the substrate. Similarly, any reference to a "zone disposed at an outlet end of the substrate" used herein refers to a zone disposed or supported on a substrate where the zone is nearer to an outlet end of the substrate than the zone is to an inlet end of the substrate. Thus, the midpoint of the zone (i.e. at half its length) is nearer to the outlet end of the substrate than the midpoint is to the inlet end of the substrate.

When the substrate is a wall-flow filter, then generally any reference to a "zone disposed at an inlet end of the substrate" refers to a zone disposed or supported on the substrate that is:
(a) nearer to an inlet end (e.g. open end) of an inlet channel of the substrate than the zone is to a closed end (e.g. blocked or plugged end) of the inlet channel, and/or
(b) nearer to a closed end (e.g. blocked or plugged end) of an outlet channel of the substrate than the zone is to an outlet end (e.g. open end) of the outlet channel.

Thus, the midpoint of the zone (i.e. at half its length) is (a) nearer to an inlet end of an inlet channel of the substrate than the midpoint is to the closed end of the inlet channel, and/or (b) nearer to a closed end of an outlet channel of the substrate than the midpoint is to an outlet end of the outlet channel.

Similarly, any reference to a "zone disposed at an outlet end of the substrate" when the substrate is a wall-flow filter refers to a zone disposed or supported on the substrate that is:
(a) nearer to an outlet end (e.g. an open end) of an outlet channel of the substrate than the zone is to a closed end (e.g. blocked or plugged) of the outlet channel, and/or
(b) nearer to a closed end (e.g. blocked or plugged end) of an inlet channel of the substrate than it is to an inlet end (e.g. an open end) of the inlet channel.

Thus, the midpoint of the zone (i.e. at half its length) is (a) nearer to an outlet end of an outlet channel of the substrate than the midpoint is to the closed end of the outlet channel, and/or (b) nearer to a closed end of an inlet channel of the substrate than the midpoint is to an inlet end of the inlet channel.

A zone may satisfy both (a) and (b) when the washcoat is present in the wall of the wall-flow filter (i.e. the zone is in-wall).

The expression "consist essentially" as used herein limits the scope of a feature to include the specified materials, and any other materials or steps that do not materially affect the basic characteristics of that feature, such as for example minor impurities. The expression "consist essentially of" embraces the expression "consisting of".

The expression "substantially free of" as used herein with reference to a material, typically in the context of the content of a washcoat region, a washcoat layer or a washcoat zone, means that the material in a minor amount, such as ≤5% by weight, preferably ≤2% by weight, more preferably ≤1% by weight. The expression "substantially free of" embraces the expression "does not comprise".

The expression "about" as used herein with reference to an end point of a numerical range includes the exact end point of the specified numerical range. Thus, for example, an expression defining a parameter as being up to "about 0.2" includes the parameter being up to and including 0.2.

The term "selective catalytic reduction filter catalyst" as used herein includes a selective catalytic reduction formulation that has been coated onto a diesel particulate filter (SCR-DPF), which is known in the art.

EXAMPLES

The invention will now be illustrated by the following non-limiting examples.

Example 1

A first slurry was prepared by milling alumina powder in water to a d90<20 micron. Soluble platinum and palladium salts were added in platinum to palladium weight ratio of 1:1. The resulting washcoat was applied to the inlet channels of a cordierite flow through substrate using established coating techniques. The coating depth of this washcoat was to 80% of substrate length. The part was dried. A second slurry was prepared by milling alumina powder in water to d90<20 micron. Soluble platinum salt was added and the slurry stirred to homogenise. The resulting washcoat was applied to the outlet channels of the cordierite flow through substrate using established coating techniques. The coating depth of this washcoat was to 80% of substrate length. The part was dried and calcined at 500° C.

Soluble platinum and palladium salts were mixed in a platinum to palladium weight ratio of 1:1 and diluted with water. The solution was applied to the inlet channels of the cordierite substrate using established coating techniques. The coating depth was to 25% of the substrate length. The part was dried. The PGM loading of this coating was 35 g ft$^{-3}$.

A sulfur trap coating was prepared by slurrying an alpha-alumina powder (low specific surface area) in water and milling to a d90<20 micron. Soluble palladium salt was added to the slurry followed by ascorbic acid. The mixture was stirred to homogenise. The resulting washcoat was applied to the outlet channels of the flow through substrate using established coating techniques. The coating depth of this washcoat was 50% of the substrate length. The palladium loading in this washcoat was 20 g ft$^{-3}$. The part was dried and calcined at 500° C. The total PGM loading of the DOC was 43 g ft$^{-3}$.

Example 2

The catalyst was made in the same way as Example 1 except that the sulfur trap coating comprising alpha-alumina was not applied to the substrate.

Experimental Results

The catalysts of Examples 1 and 2 were fitted onto a 6.0 liter diesel bench mounted engine. Catalytic activity was determined by stepwise increasing the load on the engine to increase the exhaust gas temperature. Concentrations of the exhaust gas pollutants were measured both pre- and post-catalyst. The oxidation activity for NO is determined as the percentage NO$_2$ as a proportion of total NO$_x$ post-catalyst at specific temperatures of 250, 280, 310, 410 and 520° C. The percentage NO$_2$/NO$_x$ for Examples 1 and 2 are reported in Table 1.

TABLE 1

| Temperature point DOC (° C.) | NO$_2$/NO$_x$ post-DOC (%) | |
| --- | --- | --- |
|  | Example 1 | Example 2 |
| 250 | 32 | 30 |
| 280 | 47 | 47 |
| 310 | 57 | 60 |
| 410 | 42 | 44 |
| 520 | 15 | 15 |

Table 1 shows the NO oxidation activity of Examples 1 and 2 expressed as percentage NO$_2$ of total NO$_x$. Examples 1 and 2 have very similar performance. Example 1 has the sulfur trapping coating made according to the invention. The addition of the sulfur trapping coating has no negative impact on NO oxidation activity.

Examples 1 and 2 were fitted onto a 6.0 liter diesel bench mounted engine. The sulfur resistance of the catalysts was determined by running the engine on 290 ppm S diesel fuel and exposing the catalysts to the exhaust gas at 250° C. for 1 hour with a gas space velocity of 71000. Following this exposure to sulfur, the DOC temperature was increased to 350° C. for 20 minutes. During this time the percentage NO$_2$ as a proportion of total NO$_x$ after the DOC was measured. This procedure was repeated 49 times. The results are shown in FIG. 12.

Figure 12:
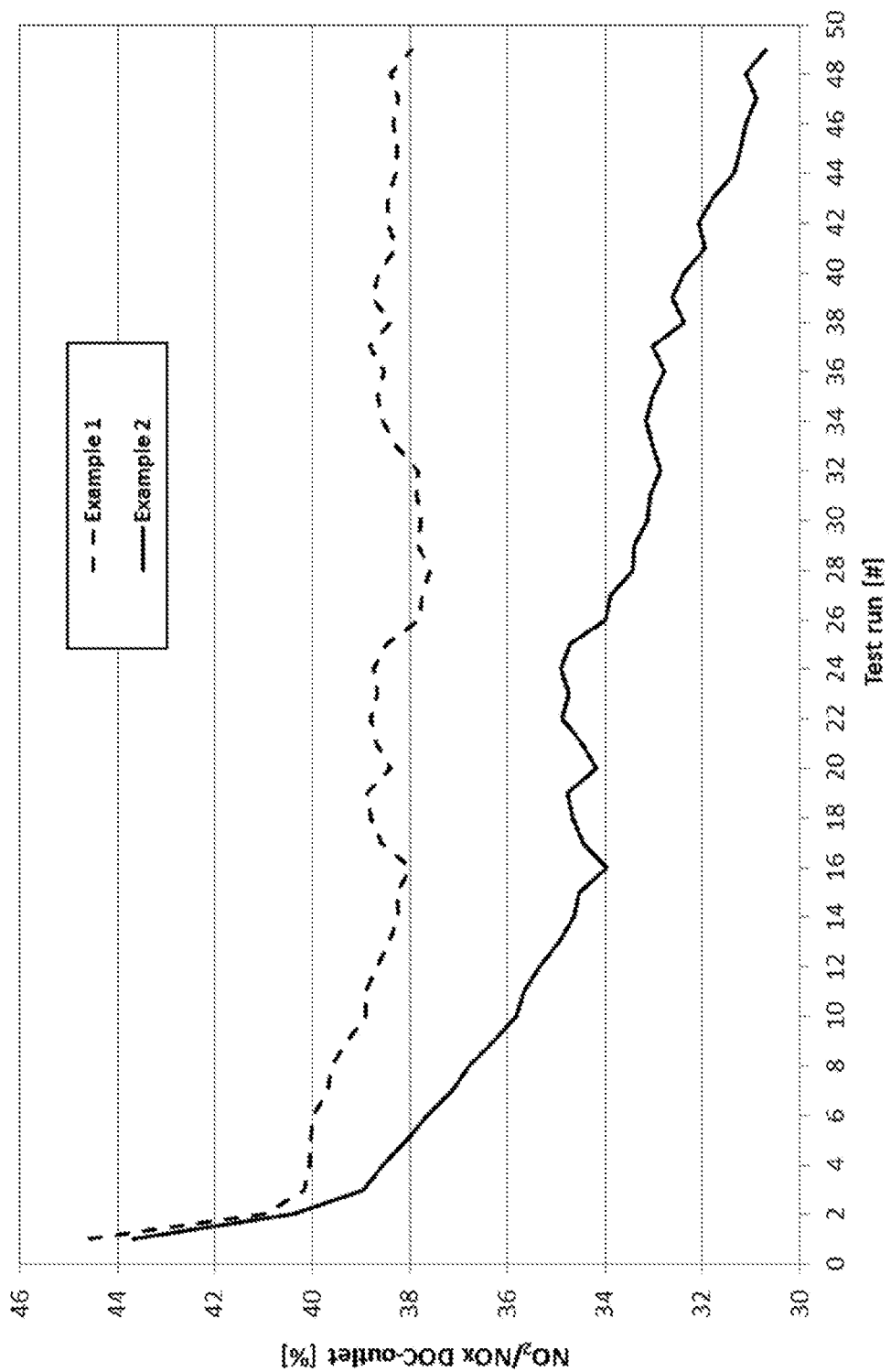
FIG. 12 is a graph showing the percentage of $NO_2$ of $NO_x$ at the outlet of the catalysts of Examples 1 and 2 after a series of test runs where they were exposed to sulfur.

FIG. 12 shows the NO oxidation activity expressed as the percentage of NO$_2$ as a proportion of NO$_x$ for Examples 1 and 2 over 49 cycles of sulfur exposure. Example 1 maintains a higher NO oxidation activity over the 49 cycles than Example 2. Example 1 comprises the sulfur trapping coating made according to the invention. Example 2 does not comprise the sulfur trapping coating and suffers a greater deterioration in NO oxidation performance over 49 cycles of sulfur exposure.

For the avoidance of any doubt, the entire content of any and all documents cited herein is incorporated by reference herein.

The invention claimed is:

1. An oxidation catalyst for treating an exhaust gas produced by a diesel engine, wherein the oxidation catalyst comprises:
   a substrate;
   a capture material for capturing at least one sulfur containing impurity in the exhaust gas produced by the diesel engine; wherein the capture material comprises a metal for reacting with an oxide of sulfur in the exhaust gas and particles of a refractory oxide, and
   wherein the particles of the refractory oxide have a mean specific surface area less than or equal to 50 m$^2$/g; and
   a catalytic region disposed on the substrate;
   wherein the catalytic region comprises a catalytic material comprising a platinum group metal (PGM) selected from the group consisting of platinum (Pt), palladium (Pd) and a combination of platinum (Pt) and palladium (Pd).

2. The oxidation catalyst of claim 1, wherein the metal for reacting with an oxide of sulfur in the exhaust gas is palladium (Pd), magnesium (Mg), cerium (Ce) or a combination of any two or more thereof.

3. The oxidation catalyst of claim 1, wherein the capture material comprises particles of the metal for reacting with an oxide of sulfur in the exhaust gas having a mean particle size of from about about 10 nm to about 5 microns.

4. The oxidation catalyst of claim 1, wherein the refractory oxide of the capture material is alumina.

5. The oxidation catalyst of claim 1, wherein the platinum group metal (PGM) is platinum (Pt), palladium (Pd) or a combination of platinum (Pt) and palladium (Pd).

6. The oxidation catalyst of claim 1, wherein the catalytic material further comprises a support material, and wherein the platinum group metal (PGM) is supported on the support material, and wherein the support material comprises a refractory oxide selected from the group consisting of alumina, silica, titania, zirconia, ceria, silica-alumina, titania-alumina, zirconia-alumina, ceria-alumina, titania-silica, zirconia-silica, zirconia-titania, ceria-zirconia and alumina-magnesium oxide.

7. The oxidation catalyst of claim 6, wherein the refractory oxide of the support material supporting the PGM is alumina, silica or silica-alumina.

8. The oxidation catalyst of claim 6, wherein the refractory oxide of the support material supporting the PGM is titania.

9. The oxidation catalyst of claim 1 further comprising a capture region, wherein the capture region comprises the capture material.

10. The oxidation catalyst of claim 9, wherein the capture region is a capture layer.

11. The oxidation catalyst of claim 10, wherein the catalytic region is a catalytic layer, and wherein the capture layer is disposed on the catalytic layer, and the catalytic layer is disposed on the substrate.

12. The oxidation catalyst of claim 10 wherein the catalytic region is a first catalytic zone and a second catalytic zone, and the capture layer is disposed on both the first catalytic zone and the second catalytic zone, and wherein the first catalytic zone and the second catalytic zone are disposed on the substrate.

13. The oxidation catalyst of claim 9, wherein the capture region is a capture zone.

14. The oxidation catalyst of claim 13, wherein the catalytic region is either:
   (a) a catalytic layer, and the capture zone is disposed on the catalytic layer; or
   (b) a catalytic zone, wherein the catalytic zone is disposed at an outlet end of the substrate and the capture zone is disposed at an inlet end of the substrate; or
   (c) a catalytic zone, wherein the catalytic zone is disposed at an inlet end of the substrate and the capture zone is disposed at an outlet end of the substrate.

15. The oxidation catalyst of claim 9, wherein the substrate comprises an inlet end surface and an outlet end surface, and the capture region is a capture face, which is disposed on the inlet end surface and/or the outlet end surface, and optionally wherein the capture face has a mean length from the inlet end surface of the substrate of <25 mm.

16. The oxidation catalyst of claim 15, wherein the catalytic region is either:
   (a) a catalytic layer disposed on the substrate; or
   (b) a first catalytic layer and a second catalytic layer, wherein the first catalytic layer is disposed on the second catalytic layer, and the second catalytic layer is disposed on the substrate; or (c) a first catalytic zone and a second catalytic zone, wherein the first catalytic zone is disposed upstream of the second catalytic zone.

17. The oxidation catalyst of claim 1, wherein the substrate is a flow-through monolith substrate or a filtering monolith substrate, which is a wall-flow filter.

18. The oxidation catalyst of claim 1, wherein the substrate has a diameter of greater than or equal to 7 inches (17.8 cm).

19. An exhaust system for treating an exhaust gas produced by a diesel engine, wherein the exhaust system comprises an oxidation catalyst according to claim 1 and an emissions control device.

20. The oxidation catalyst of claim 1, wherein the particles of the refractory oxide are coated with particles of the metal for reacting with an oxide of sulfur in the exhaust gas.

21. The oxidation catalyst of claim 1, wherein the particles of the refractory oxide of the capture material comprise alumina, silica, titania, zirconia, silica-alumina, titania-alumina, zirconia-alumina, titania-silica, zirconia-silica, zirconia-titania, or alumina-magnesium oxide.

22. The oxidation catalyst of claim 1, wherein the particles of the refractory oxide of the capture material comprise alumina, silica, or silica-alumina.

23. The oxidation catalyst of claim 1, wherein the particles of the refractory oxide of the capture material have a mean specific surface area of less than or equal to 30 $m^2/g$.

24. The oxidation catalyst of claim 1, wherein the particles of the refractory oxide of the capture material have a mean specific surface area of less than or equal to 20 $m^2/g$.

25. The oxidation catalyst of claim 1, wherein the capture material comprises particles of the metal for reacting with an oxide of sulfur in the exhaust gas having a mean particle size in a range of from 50 nm to 5 microns.

26. The oxidation catalyst of claim 1, wherein the capture material comprises particles of the metal for reacting with an oxide of sulfur in the exhaust gas having a mean particle size in a range of from 75 nm to 3 microns.

* * * * *